US012706521B2

(12) United States Patent
Consoli et al.

(10) Patent No.: US 12,706,521 B2
(45) Date of Patent: Aug. 11, 2026

(54) SINGLE-INPUT, MULTI-OUTPUT DIRECT-CURRENT-TO-DIRECT CURRENT CONVERTERS AND ASSOCIATED METHODS

(71) Applicant: Analog Devices International Unlimited Company, Limerick (IE)

(72) Inventors: Elio Consoli, Gravina di Catan (IT); Marco Masini, Milan (IT); Giuseppe Patti, Catania (IT); Manuel Di Cera, Nova Siri (IT)

(73) Assignee: ANALOG DEVICES INTERNATIONAL UNLIMITED COMPANY, Limerick (IE)

( * ) Notice: Subject to any disclaimer, the term of this patent is extended or adjusted under 35 U.S.C. 154(b) by 244 days.

(21) Appl. No.: 18/598,941

(22) Filed: Mar. 7, 2024

(65) Prior Publication Data

US 2025/0286458 A1 Sep. 11, 2025

(51) Int. Cl.
*H02M 1/00* (2006.01)
*H02M 3/158* (2006.01)

(52) U.S. Cl.
CPC ......... *H02M 1/009* (2021.05); *H02M 3/1582* (2013.01)

(58) Field of Classification Search
CPC ............................ H02M 1/009; H02M 3/1582
See application file for complete search history.

(56) References Cited

U.S. PATENT DOCUMENTS 10,291,126 B1 5/2019 Wei et al.
2021/0281173 A1* 9/2021 Eirea ..................... H02M 3/158

(Continued)

FOREIGN PATENT DOCUMENTS

EP 3522374 A1 8/2019

OTHER PUBLICATIONS

Jin et al., "Power Loss Analysis of a Back-to-Back Switching Single-Inductor Multiple-Output Inverter", 2019 IEEE Applied Power Electronics Conference and Exposition (APEC), IEEE, Mar. 17, 2019, pp. 689-694.

(Continued)

*Primary Examiner* — Harry R Behm
(74) *Attorney, Agent, or Firm* — Knobbe, Martens, Olson & Bear, LLP

(57) ABSTRACT

A single-input, multiple-output (SIMO) direct-current-to-direct-current (DC-to-DC) converter includes a (i) power conversion stage electrically coupled between an input power node and a switching node and (ii) a plurality of output switching blocks. Each output switching block is electrically coupled between the switching node and a respective output power node. Each output switching block includes a respective input N-type metal oxide semiconductor field effect transistor (input NMOS FET) and a respective output N-type metal oxide semiconductor field effect transistor (output NMOS FET). The input NMOS FET is oriented in each output switching block such that a cathode of a body diode of the input NMOS FET is electrically coupled to the switching node. The output NMOS FET is oriented in each output switching block such that a cathode of a body diode of the output NMOS FET is electrically coupled to the output power node of the output switching block.

20 Claims, 15 Drawing Sheets

(56) References Cited

U.S. PATENT DOCUMENTS

2022/0337160 A1 10/2022 Zeinali et al.
2023/0318457 A1* 10/2023 Terrace ............... H02M 3/1582
323/271

OTHER PUBLICATIONS

Yoon et al., "A Single-Inductor-Multiple-Output (SIMO) 0.8-V/1.8-V/12-V Step-Up/Down Converter With Low-Quiescent Current for Implantable Electroceutical SoCs", IEEE Solid-State Circuits Letters, IEEE, vol. 4, Oct. 18, 2021, pp. 182-185.
Extended European Search Report issued in European Patent Application No. 25160412.0, dated Jul. 1, 2025 in 10 pages.

* cited by examiner

104(1)
From Switching Node 110
sbin(1)
206(1)
$V_b(1)$
220(1)
214(1)
$V_{int}(1)$
220(1)
$V_b(1)$
G
D
S
K
A
216(1)
202(1)
214(1)
Bootstrap Circuitry
210(1)
$V_{aux}$
126
$V_{int}(1)$
212(1)
rc(1)
114
204(1)
218(1)
220(1)
$V_b(1)$
214(1)
$V_{int}(1)$
208(1)
sbout(1)
112(1)
$V_{out}(1)$
$I_{out}(1)$

SINGLE-INPUT, MULTI-OUTPUT DIRECT-CURRENT-TO-DIRECT CURRENT CONVERTERS AND ASSOCIATED METHODS

BACKGROUND

Many electrical devices require multiple power supply rails. For example, an electrical device may require two or more power supply rails to power circuitry having different power supply voltage requirements. As another example, an electrical device may require two or more power supply rails to enable two or more systems within the electrical device to be independently powered on and powered off.

DETAILED DESCRIPTION OF THE EMBODIMENTS

Figure 1:
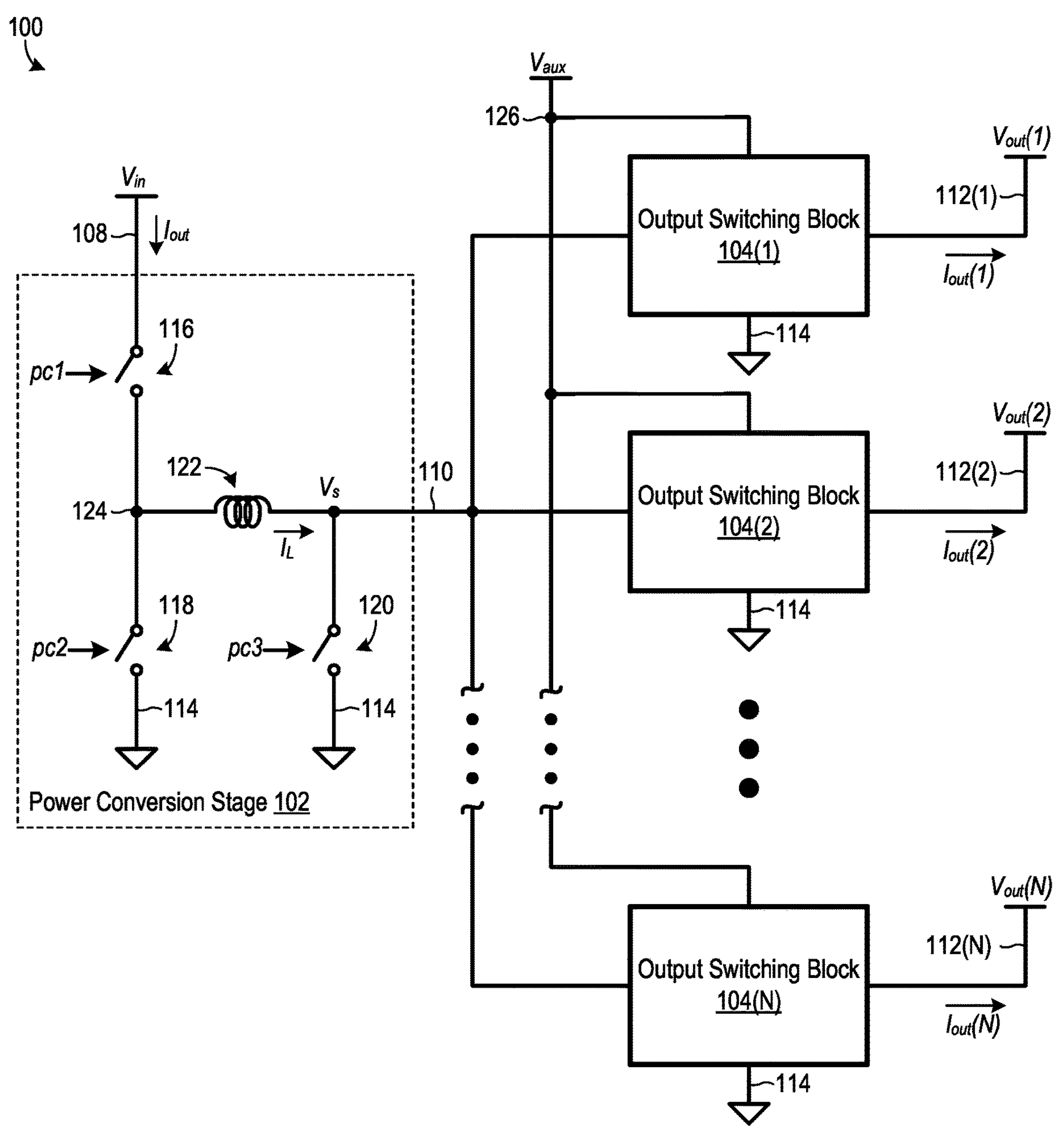
FIG. 1 is a schematic diagram of a single-input, multiple-output (SIMO) direct-current-to-direct-current (DC-to-DC) converter, according to an embodiment.

A plurality of power supply rails in an electrical device can be provided by providing a respective power converter, such as a respective direct-current-to-direct-current (DC-to-DC) converter, for each power supply rail. However, providing a respective power converter for each power supply rail may be expensive and require significant space. Therefore, it is frequently desirable to provide multiple power supply rails from a single power converter. For example, a single-input, multi-output (SIMO) DC-to-DC converter may be used to provide multiple output power nodes from a single input power node. The output power nodes, though, require output switching circuitry with bidirectional current blocking capability to ensure that each output power node is electrically isolated from each other output power node, as well as to enable control of which output power node is powered by the SIMO DC-to-DC converter at a given time.

It is frequently desirable to implement a switch, such as in output switching circuitry of a SIMO DC-to-DC converter, using an enhancement mode, N-type metal oxide semiconductor field effect transistor (NMOS FET) because an NMOS FET generally has lower on-resistance than an enhancement mode, P-type metal oxide semiconductor field effect transistor (PMOS FET) of similar size. Additionally, NMOS FET fabrication is highly developed in modern semiconductor fabrication processes. However, an NMOS FET includes a body diode between its source and drain which generally prevents the NMOS FET from blocking bidirectional current. While this issue can be overcome by managing the body diode through body switching, body switching is risky and non-robust because the body is floating for a short time during switching, which impairs breakdown voltage rating of the NMOS FET. Additionally, body switching necessitates complex gate drive schemes, and there may be limited support for body switching in a semiconductor fabrication process.

As such, it is generally desirable to electrically couple two NMOS FETs in series with opposing body diode orientations to enable bidirectional current blocking, instead of implementing body switching. However, gate drive of two series-connected NMOS FETs in output switching circuitry of a SIMO DC-to-DC converter is non-trivial. For example, one conventional approach for driving gates of NMOS FETs in output switching circuitry of a SIMO DC-to-DC converter requires a respective bootstrap driving domain referred to the switching node and a respective power supply rail for each output power node referred to the output power node itself, which may be costly, space consuming, and quiescent current demanding. As another example, another conventional approach for driving gates of NMOS FETs in output switching circuitry of a SIMO DC-to-DC converter relies on a single power supply rail to power high-side NMOS FETs across multiple output power nodes, which may limit operating voltage range and/or be unable to achieve high performance.

Disclosed herein are new SIMO DC-to-DC converters which at least partially overcome the above discussed drawbacks. The new SIMO DC-to-DC converters include a respective output switching block for each output power node where each output switching block requires only a single respective power supply rail, thereby promoting low SIMO DC-to-DC converter cost and small SIMO DC-to-DC converter size. Additionally, NMOS FETs are oriented in the output switching blocks of the new SIMO DC-to-DC converters in a manner that promotes robust and simple gate drive of the NMOS FETs with a single power supply rail, thereby helping achieve high performance, such as low on-resistance. Furthermore, the new SIMO DC-to-DC converters do not require field effect transistor body switching, thereby further promoting robust operation. Moreover, particular embodiments of the new SIMO DC-to-DC converters can achieve high performance operation over a wider voltage range than can be realized by typical conventional SIMO DC-to-DC converters. For example, certain embodiments are easily scalable to operate over different voltage ranges simply by changing the drain-to-source and drain-to-gate voltage ratings of constituent NMOS FETs, which are frequently available in a wide range of ratings in typical semiconductor fabrication processes.

FIG. 1 is a schematic diagram of a SIMO DC-to-DC converter 100, which is one embodiment of the new SIMO DC-to-DC converters disclosed herein. The SIMO DC-to-DC converter 100 includes a power conversion stage 102, N output switching blocks 104, and a controller 106, where N is an integer greater than or equal to two. In this document, specific instances of an item may be referred to by use of a numeral in parentheses (e.g. the output switching block 104(1)) while numerals without parentheses refer to any such item (e.g. the output switching blocks 104). Although FIG. 1 illustrates N being at least three, it is understood that N could be equal to two. The power conversion stage 102 is electrically coupled between an input power node 108 and a switching node 110, and each output switching block 104 is electrically coupled between the switching node 110 and a respective output power node 112. Each output power node implements, for example, a respective power supply rail that electrically powers one or more loads (not shown). The SIMO DC-to-DC converter 100 can, and typically will, include additional components, such as one or more capacitors (not shown), electrostatic discharge (ESD) protection circuitry (not shown), etc.

The input power node 108 has an input voltage $V_{in}$ with respect to a reference node 114, and each output power node 112 has a respective output voltage $V_{out}$ with respect to the reference node 114. While not required, in some embodiments, nominal magnitude of the output voltage $V_{out}$ varies among two or more of the output power nodes 112, such as to enable the SIMO DC-to-DC converter 100 to power two or more loads requiring different power supply voltage magnitude. The reference node 114 is depicted as being a ground node, such as an earth ground node or a chassis ground node. It is understood, though, that the reference node 114 need not be a ground node, and the reference node 114 accordingly could be at a different electrical potential than an earth ground or a chassis ground. An input current $I_{in}$ flows into the SIMO DC-to-DC converter 100 from the input power node 108, and a respective output current Iout flows out of each output power node 112 to a load (not shown) electrically coupled to the output power node 112. A respective polarity of the input current $I_{in}$ and each output current Iout could be either positive or negative, depending on the operating conditions of the SIMO DC-to-DC converter 100.

The power conversion stage 102 includes a power conversion switching device 116, a power conversion switching device 118, a power conversion switching device 120, and an inductor 122. Each of the aforementioned power conversion switching devices includes, for example, one or more transistors and associated driver circuitry. The power conversion switching device 116 is electrically coupled between the input power node 108 and a connection node 124, and the power conversion switching device 118 is electrically connected between the connection node 124 and the reference node 114. The inductor 122 is electrically coupled between the connection node 124 and the switching node 110, and the power conversion switching device 120 is electrically coupled between the switching node 110 and the reference node 114. The power conversion switching device 116 is controlled by a signal pc1 generated by the controller 106, the power conversion switching device 118 is controlled by a signal pc2 generated by the controller 106, and the power conversion switching device 120 is controlled by a signal pc3 generated by the controller 106. As discussed below, the controller 106 generates the control signal pc1, the control signal pc2, and/or the control signal pc3 to cause the power conversion stage 102 to provide a regulated voltage $V_s$ with respect to the reference node 114 at the switching node 110.

Figure 2:
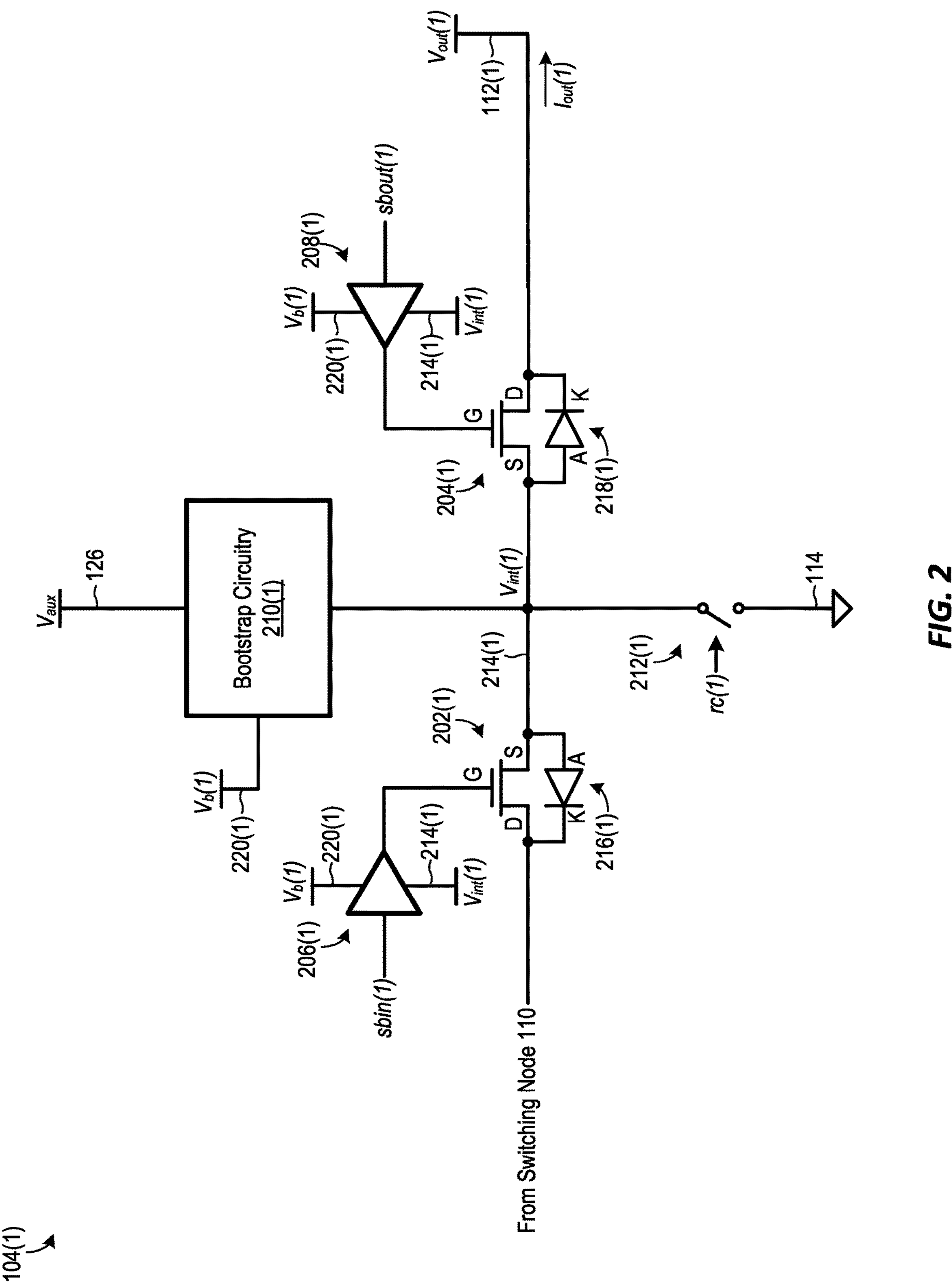
FIG. 2 is a schematic diagram of a first output switching block of the FIG. 1 SIMO DC-to-DC converter.
Figure 3:
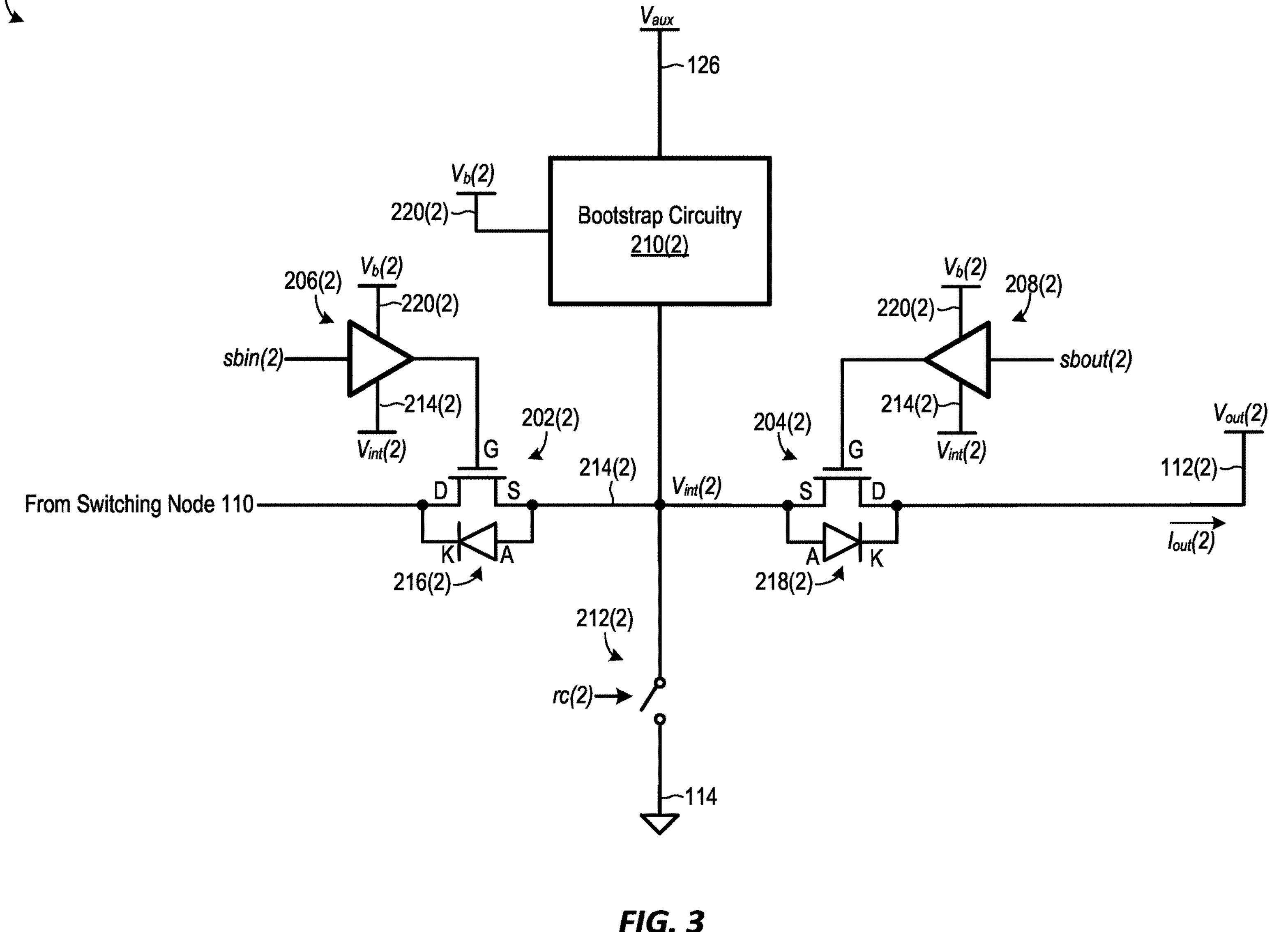
FIG. 3 is a schematic diagram of a second output switching block of the FIG. 1 SIMO DC-to-DC converter.
Figure 4:
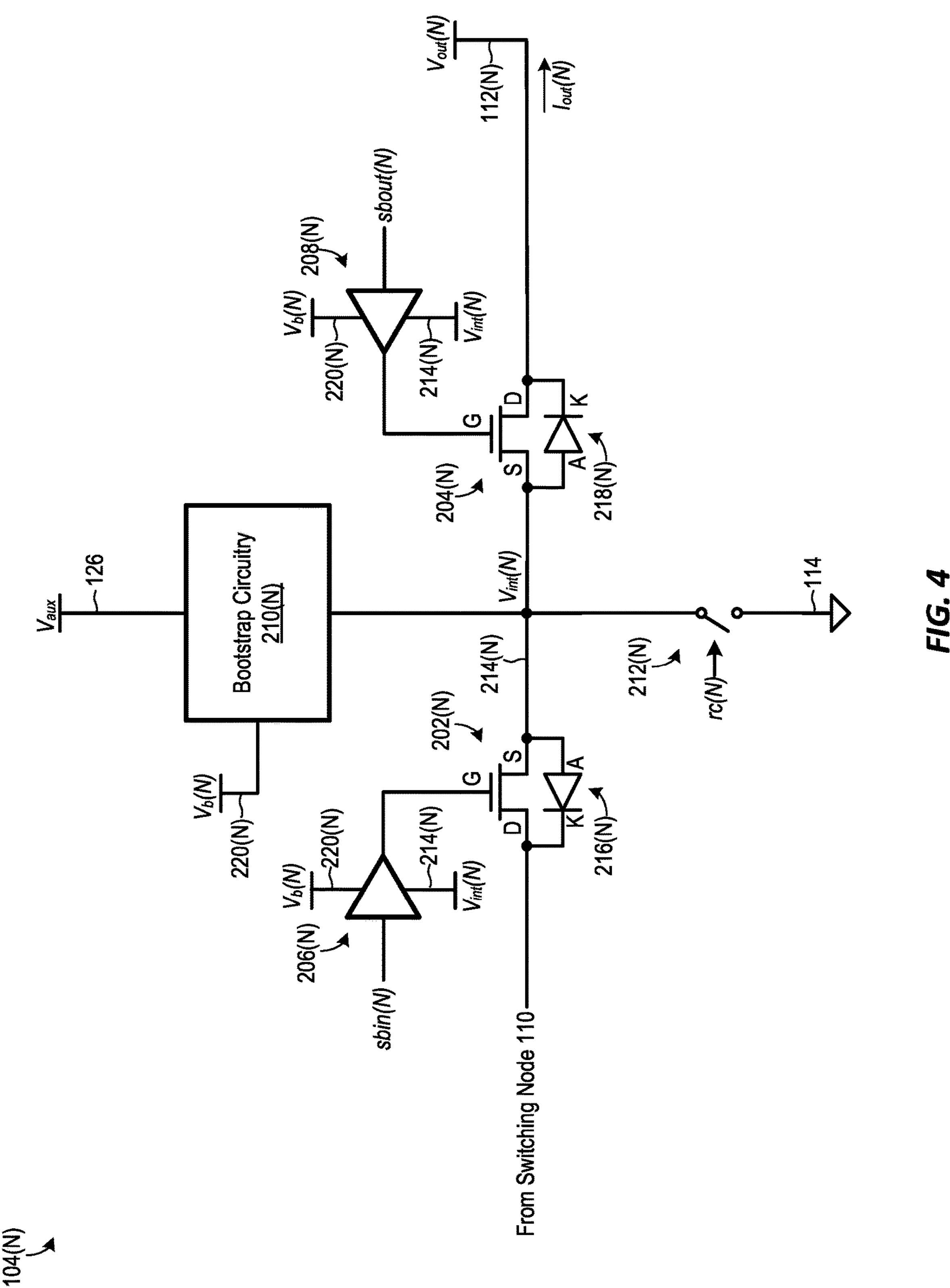
FIG. 4 is a schematic diagram of an $N^{th}$ output switching block of the FIG. 1 SIMO DC-to-DC converter.

As discussed below, each output switching block 104 is configured to connect and disconnect its respective output power node 112 from the switching node 110 under the command of the controller 106. Additionally, each output switching block 104 is capable of bidirectional current blocking and thereby electrically isolating its respective output power node 112 from each other output power node 112. Each output switching block 104 is at least partially electrically powered by an auxiliary power supply rail 126 having a voltage Vaux. Each output switching block 104 is also electrically coupled to the reference node 114. In some embodiments, each output switching block 104 is electrically powered from the input power node 108 instead of from the auxiliary power supply rail 126, and the auxiliary power supply rail 126 is therefore optionally omitted. Details of the output switching blocks 104 are not shown in FIG. 1, but FIGS. 2, 3, and 4, illustrate details of the output switching blocks 104(1), 104(2), and 104(N), respectively. It is understood that other instances of the output switching blocks 104 are embodied in a manner analogous to the output switching blocks 104(1), 104(2), and 104(N).

Referring to FIGS. 2-4, each output switching block 104 includes an input enhancement mode, N-type metal oxide semiconductor field effect transistor (input NMOS FET) 202, an output enhancement mode, N-type metal oxide semiconductor field effect transistor (output NMOS FET) 204, input switch driver circuitry 206, output switch driver circuitry 208, bootstrap circuitry 210, and a reference switching device 212. Each input NMOS FET 202 and each output NMOS FET 204 has a respective gate (G), a respective drain (D), and a respective source(S). Additionally, each input NMOS FET 202 and each output NMOS FET 204 includes a respective body diode 216 and 218 with an anode (A) and a cathode (K). In each output switching block 104, the input NMOS FET 202 is electrically coupled between the switching node 110 and an internal node 214 of the output switching block 104 with an orientation such that (i) the drain of the input NMOS FET 202, as well as the cathode of the body diode 216, are electrically coupled to the switching node 110, and (ii) the source of the input NMOS FET 202, as well as the anode of the body diode 216, are electrically coupled to the internal node 214 of the output switching block 104. Additionally, in each output switching block 104, the output NMOS FET 204 is electrically coupled between the internal node 214 of the output switching block 104 and the output power node 112 of the output switching block 104 with an orientation such that (i) the drain of the output NMOS FET 204, as well as the cathode of the body diode 218, are electrically coupled to the output power node 112, and (ii) the source of the output NMOS FET 204, as well as the anode of the body diode 218, are electrically coupled to the internal node 214 of the output switching block 104.

The bootstrap circuitry 210 of each output switching block 104 generates a respective bootstrap power supply rail 220 of the output switching block 104 having a voltage $V_b$ that is referenced to the internal node 214 of the output switching block 104. The input switch driver circuitry 206 of each output switching block 104 drives the gate of the input NMOS FET 202 of the output switching block 104 in response to a respective control signal sbin generated by the controller 106 (FIG. 1). Additionally, the output switch driver circuitry 208 of each output switching block 104 drives the gate of the output NMOS FET 204 of the output switching block 104 in response to a respective control signal sbout generated by the controller 106 (FIG. 1). In each output switching block 104, the input switch driver circuitry 206 and the output switch driver circuitry 208 are (i) powered from the bootstrap power supply rail 220 of the output switching block 104 and (ii) electrically reference to the internal node 214 of the output switching block 104 (instead of to the reference node 114). As such, in each output switching block 104, the input switch driver circuitry 206 drives the gate of the input NMOS FET 202 between the voltage $V_b$ of the bootstrap power supply rail 220 and the voltage Vint of the internal node 214, and the output switch driver circuitry 208 drives the gate of the output NMOS FET 204 between the voltage $V_b$ of the bootstrap power supply rail 220 and the voltage Vint of the internal node 214. The reference switching device 212 of each output switching block 104 is electrically coupled between the internal node 214 of the output switching block 104 and the reference node 114.

The above-described orientations of the input NMOS FETs 202 and the output NMOS FETs 204 are important. In particular, not only do the orientations enable bidirectional current blocking by preventing current flow through an output switching block 104 solely via the body diodes 216 and 218, but the orientations also facilitate gate drive of the NMOS FETs. Specifically, the above-describe orientations of the input NMOS FET 202 and the output NMOS FET 204 in an output switching block 104 result in the source of each of the two FETs to be connected to a common node, i.e., the internal node 214 of the output switching block 104, which enables the respective gates of the two FETs to receive a common gate-to-source voltage when being driven by a common power supply rail, i.e. bootstrap power supply rail 220, which facilitates robust driving of the two FETs from the common power supply rail.

Figure 5:
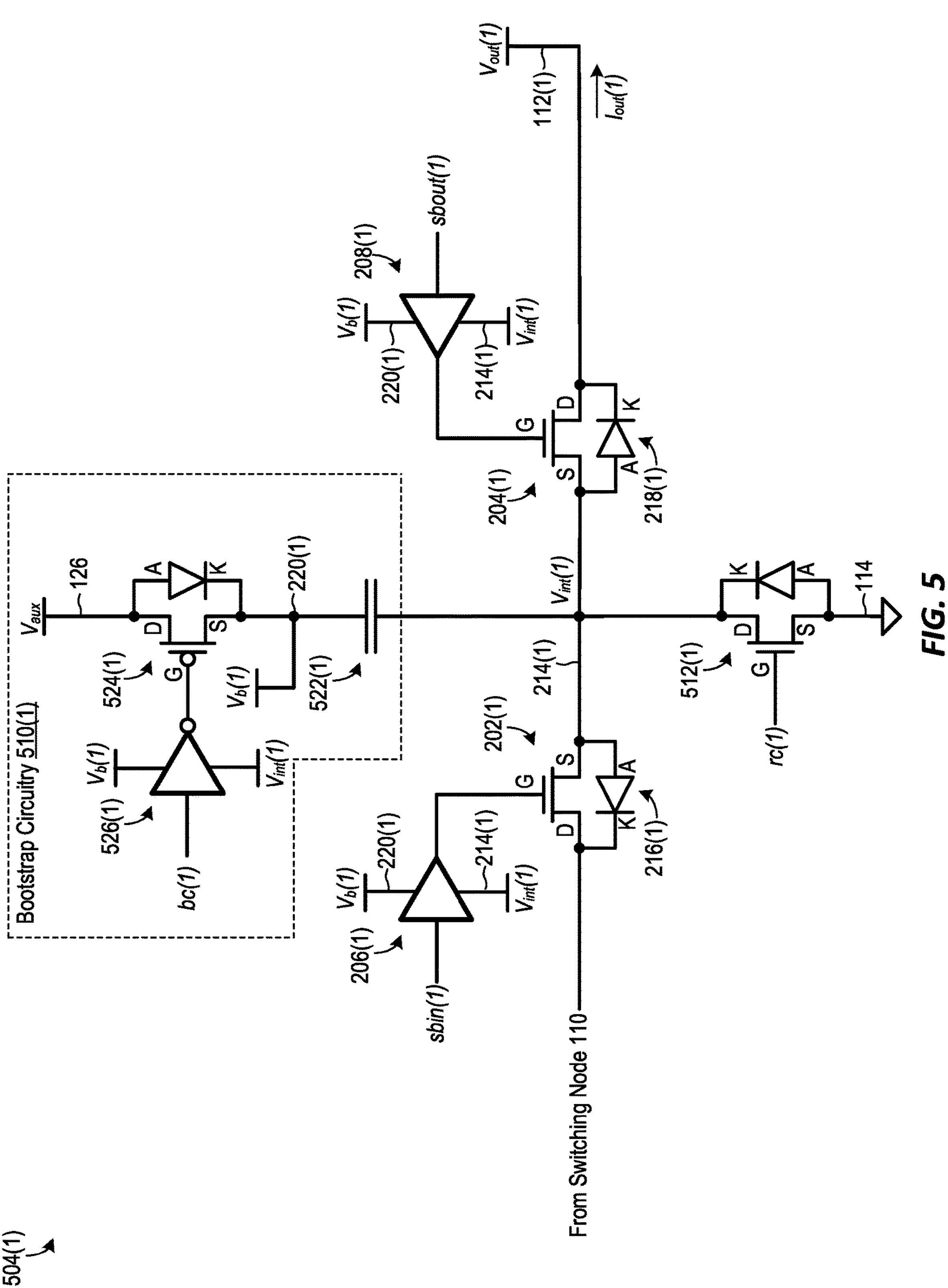
FIG. 5 is a schematic diagram of one embodiment of the first output switching block of FIG. 2.
Figure 6:
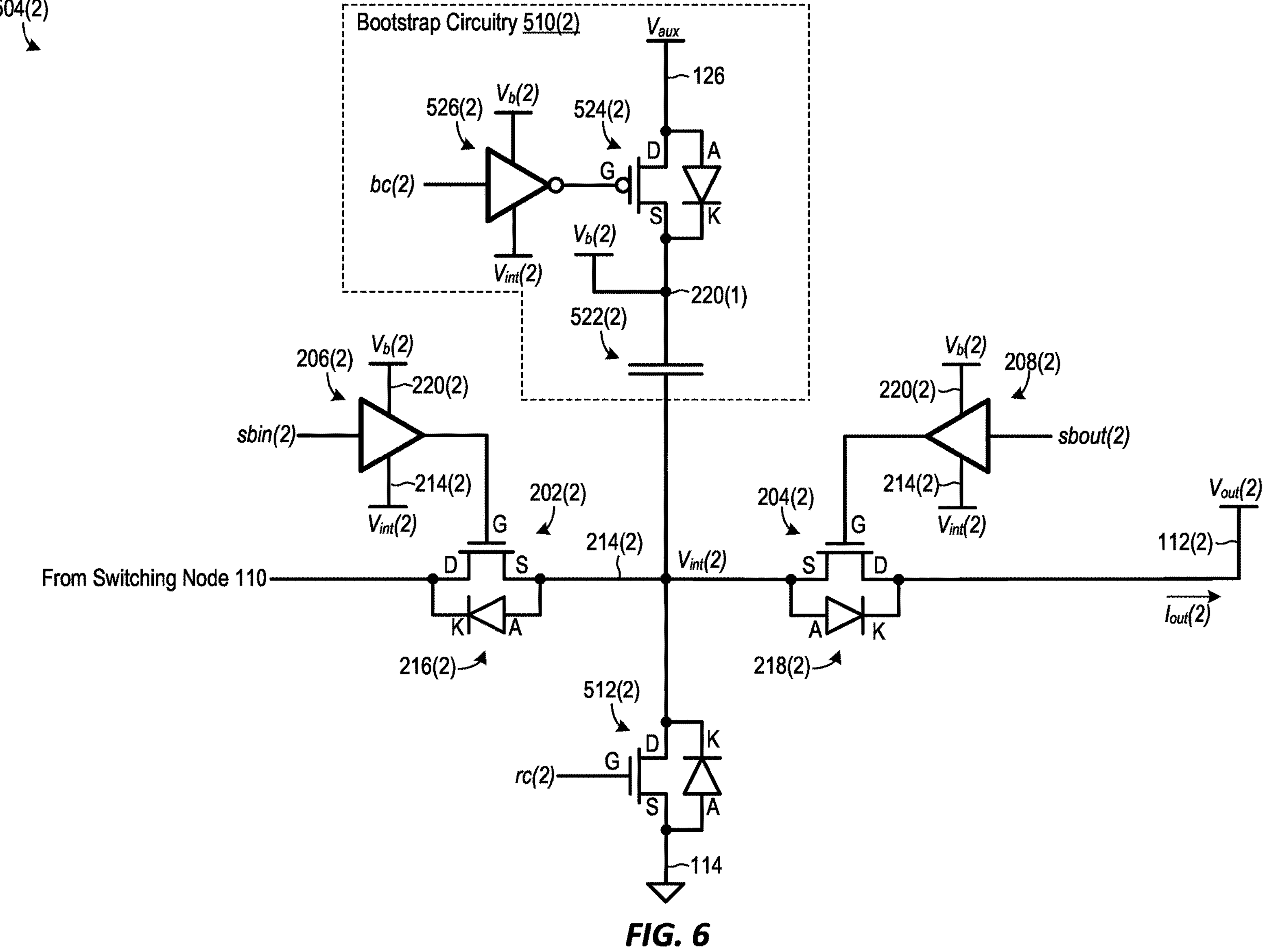
FIG. 6 is a schematic diagram of one embodiment of the second output switching block of FIG. 3.
Figure 7:
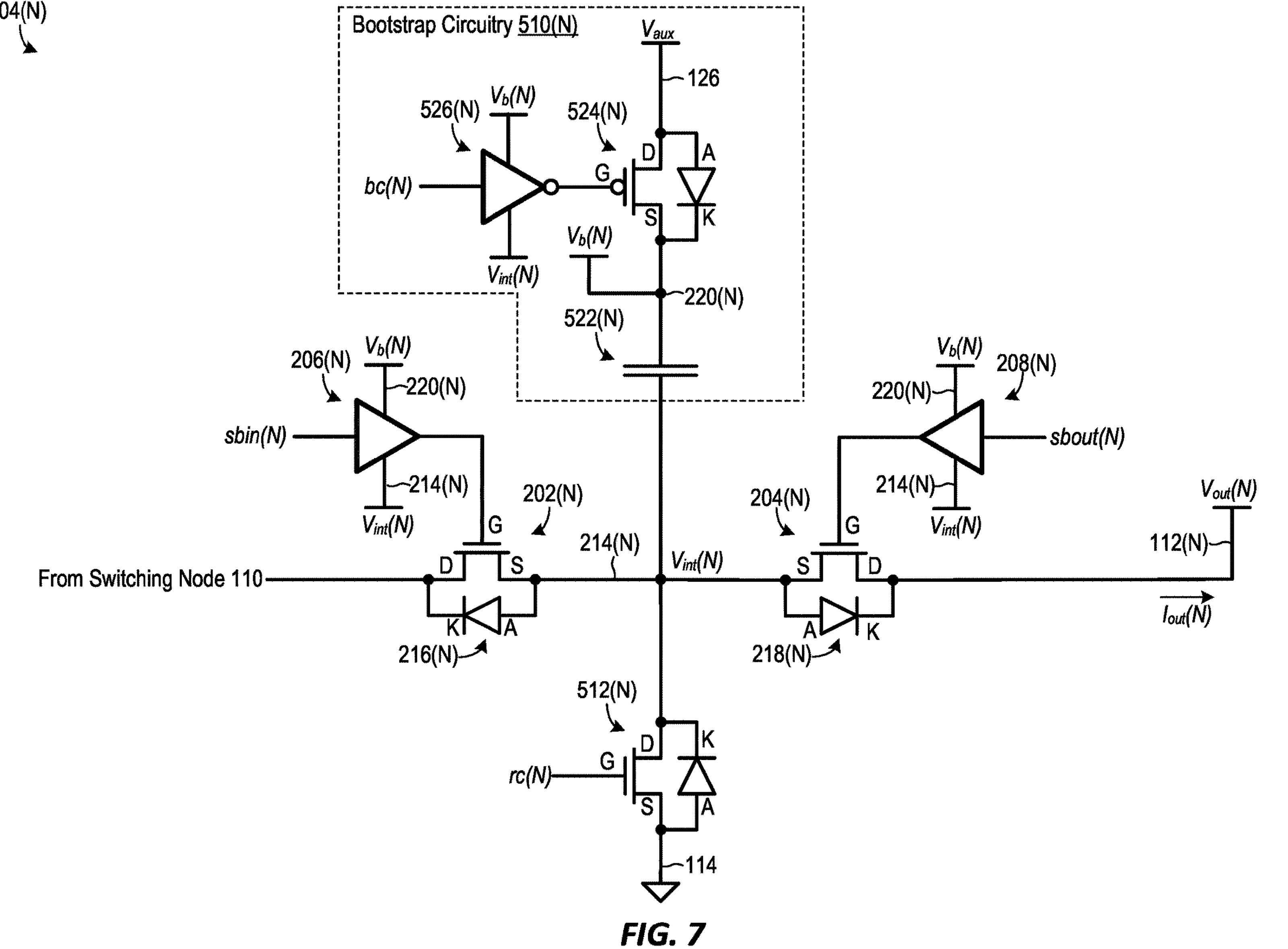
FIG. 7 is a schematic diagram of one embodiment of the $N^{th}$ output switching block of FIG. 4.

FIGS. 5-7 illustrate one possible embodiment of bootstrap circuitry 210 and reference switching device 212 of output switching blocks 104. Specifically, FIG. 5 is a schematic diagram of an output switching block 504(1), which is an embodiment of output switching block 104(1) (FIG. 2), FIG. 6 is a schematic diagram of an output switching block 504(2), which is an embodiment of output switching block 104(2) (FIG. 3), and FIG. 7 is a schematic diagram of an output switching block 504(N), which is an embodiment of output switching block 104(N) (FIG. 4). In the output switching blocks of FIGS. 5-7, bootstrap circuitry 210 is embodied by bootstrap circuitry 510, and the reference switching device 212 is embodiment by a reference enhancement mode, N-type metal oxide semiconductor field effect transistor (reference NMOS FET) 512.

In each output switching block 504, the bootstrap circuitry 510 includes a bootstrap capacitor 522 and a switching device embodied by a PMOS FET 524 and bootstrap switching device driver circuitry 526. The bootstrap capacitor 522 of each output switching block 504 is electrically coupled between the internal node 214 of the output switching block 504 and the bootstrap power supply rail 220 of the output switching block 504. Additionally, in each output switching block 504, the PMOS FET 524 is electrically coupled between the auxiliary power supply rail 126 and the bootstrap power supply rail 220 of the output switching block 504, and the bootstrap switching device driver circuitry 526 drives a gate of the PMOS FET 524 in response to a signal bc generated by the controller 106 (FIG. 1). The bootstrap switching device driver circuitry 526 of each output switching block 504 is (i) powered from the bootstrap power supply rail 220 of the output switching block 504 and (ii) is electrically referenced to the internal node 214 of the output switching block 504. As such, all switching device driver circuitry of a given output switching block 504 operates in a common power supply domain, i.e., between the bootstrap power supply rail 220 of the output switching block 504 and the internal node 214 of the output switching block 504.

A drain of the reference NMOS FET 512 in each output switching block 504 is electrically coupled to the internal node 214 of the output switching block 504, and the source of the reference NMOS FET 512 in each output switching block 504 is electrically coupled to the reference node 114. The gate of each reference NMOS FET 512 is driven by a respective control signal rc generated by the controller 106 (FIG. 1).

Referring again to FIG. 1, the controller 106 is configured to generate the control signals for the power conversion stage 102 as well as the control signals for each output switching block 104. Connections between the controller 106 and the power conversion stage 102, as well as connections between the controller 106 and the output switching blocks 104, are not shown for illustrative clarity. The controller 106 is implemented, for example, by analog and/or electronic circuitry. In some embodiments, the controller 106 is at least partially implemented by a processor (not shown) executing instructions in the form of software and/or firmware stored in a memory (not shown). Although the controller 106 is depicted as a discrete element for illustrative simplicity, the controller 106 could be partially or fully integrated with one or more other elements of the SIMO DC-to-DC converter 100. For example, some subsystems of the controller 106 could be incorporated in the power conversion stage 102 and/or in one or more of the output switching blocks 104. Additionally, the controller 106 may include multiple constituent elements that need not be co-packaged or even disposed at a common location.

As mentioned above, the controller 106 is configured to generate the control signal pc1, the control signal pc2, and/or the control signal pc3 to cause the power conversion stage 102 to provide a regulated voltage $V_s$ with respect to the reference node 114 at the switching node 110. The power conversion stage 102 has a buck and boost topology, and the magnitude of the voltage $V_s$ may therefore be greater than the magnitude of the voltage $V_{in}$, less than magnitude of the voltage $V_{in}$, or equal to magnitude of the voltage $V_{in}$. For example, the controller 106 may cause the power conversion stage 102 to operate as a boost converter such that the magnitude of voltage $V_s$ is greater than the magnitude of the voltage $V_{in}$ by (i) generating the control signal pc1 to cause the power conversion switching device 116 to continuously operate in its on-state, (ii) generating the control signal pc2 to cause the power conversion switching device 118 to continuously operate in its off-state, and (iii) generating the control signal pc3 to modulate a duty cycle of the power conversion switching device 120 to achieve a desired magnitude of the voltage $V_s$. The duty cycle of a switching device is a portion of each switching cycle of the switching device that the switching device operates in its on-state. For example, if the power conversion switching device 120 operates in its on-state for 40 percent of its switching period, the power conversion switching device 120 has a duty cycle of 40 percent. In this document, a transistor or other switching device is in its on-state when the transistor or other switching device is being controlled to operate in its conductive state. Conversely, a transistor or other switching device is in its off-state when the transistor or other switching device is being controlled to operate in its non-conductive state.

Figure 8:
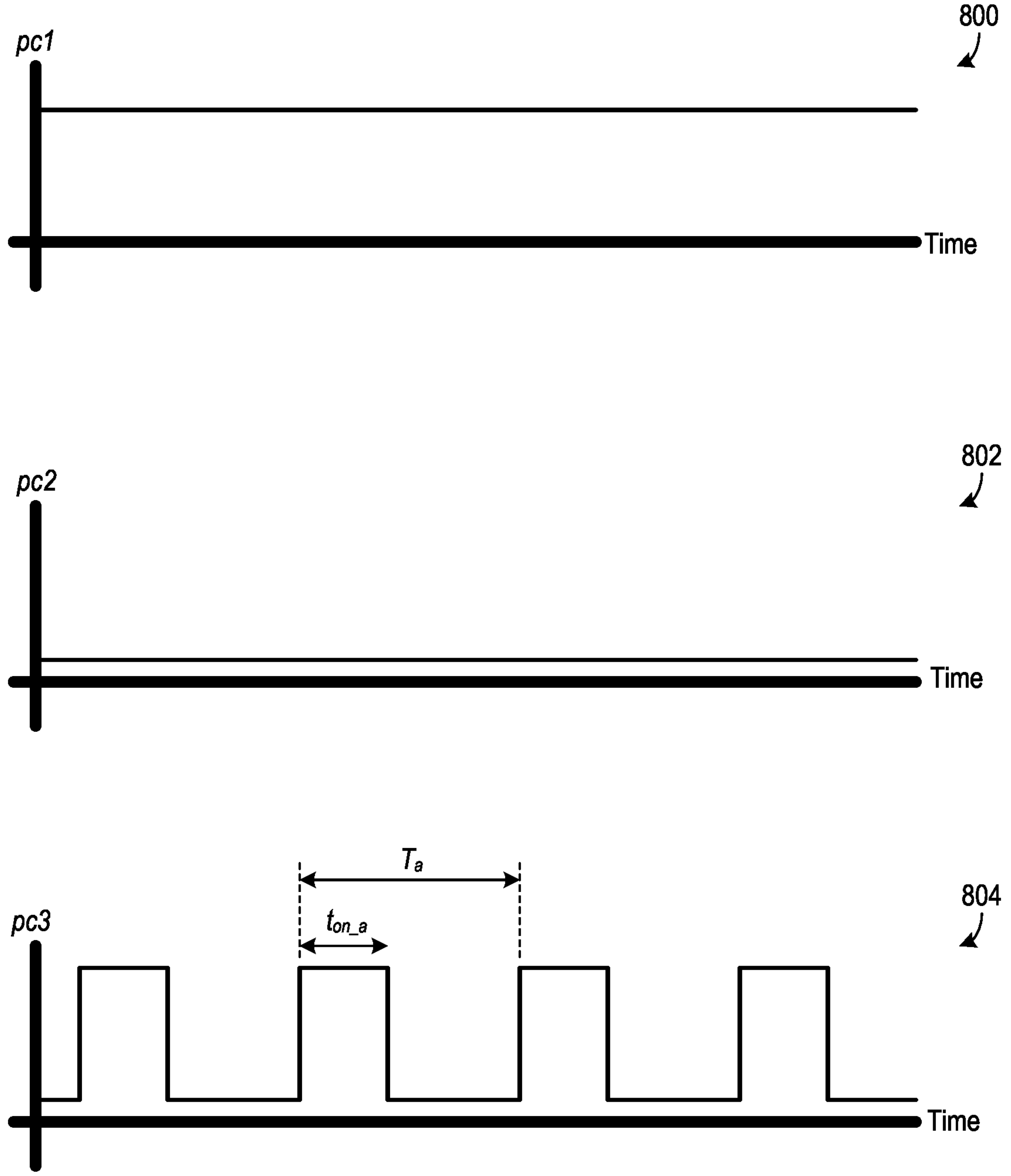
FIG. 8 includes three graphs collectively illustrating example control signals for a power conversion stage of the FIG. 1 SIMO DC-to-DC converter when the power conversion stage operates as a boost converter.

FIG. 8 includes graphs 800, 802, and 804 collectively illustrating one example of the control signals pc1, pc2, and pc3 generated by the controller 106 when the controller 106 is causing the power conversion stage 102 to act as a boost converter such that the magnitude of the voltage $V_s$ is greater than the magnitude of the voltage $V_{in}$. Graph 800 is of the control signal pc1 versus time, graph 802 is of the control signal pc2 versus time, and graph 804 is of the control signal pc3 versus time. Graphs 800, 802, and 804 have a common time base. FIG. 8 assumes that each of the power conversion switching device 116, the power conversion switching device 118, and the power conversion switching device 120 (*i*) operates in its on-state when its respective control signal is logic high and (ii) operates in its off-state when its respective control signal is logic low. However, the power conversion switching devices of power conversion stage 102 could be configured to respond to control signals in other manners without departing from the scope hereof. In the FIG. 8 example, the control signal pc1 is continuously logic high such that the power conversion switching device 116 continuously operates in its on-state, and the control signal pc2 is continuously logic low such that the power conversion switching device 118 continuously operates in its off-state. Additionally, the controller 106 generates the control signal pc3 in the FIG. 8 example such that (i) the control signal pc3 has a switching period $T_a$, (ii) the control signal pc3 is logic high for a duration of $t_{on\_a}$ of each switching period $T_a$, and (iii) the duration of $t_{on\_a}$ is 40 percent of the switching period $T_a$. As such, the power conversion switching device 120 has a duty cycle of 40 percent in the FIG. 8 example.

Figure 9:
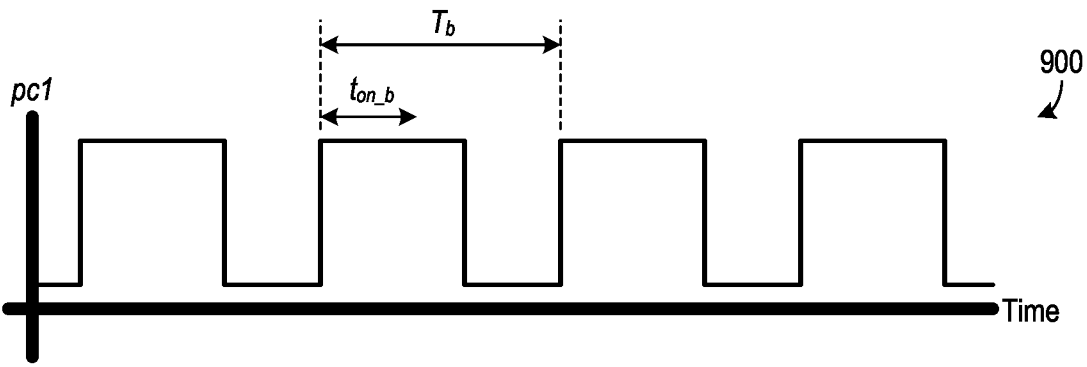
FIG. 9 includes three graphs collectively illustrating example control signals for a power conversion stage of the FIG. 1 SIMO DC-to-DC converter when the power conversion stage operates as a buck converter.
Figure 9:
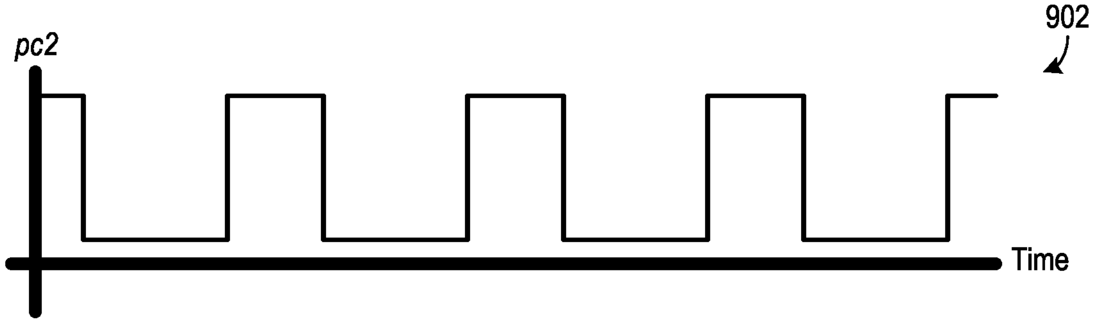
Figure 9:

Referring again to FIG. 1, controller 106 may cause the power conversion stage 102 to operate as a buck converter such that the magnitude of the voltage $V_s$ is less than or equal to the magnitude of the voltage $V_{in}$ by (i) generating the control signal pc1 to modulate a duty cycle of the power conversion switching device 116 to achieve a desired magnitude of voltage $V_s$, (ii) generating the control signal pc2 to cause the power conversion switching device 118 to perform a freewheeling function, i.e., to provide a path for the current $I_L$ flowing through the inductor 122 when the power conversion switching device 116 is in its off-state, and (iii) generating the control signal pc3 to cause the power conversion switching device 120 to continuously operate in its off-state. For example, FIG. 9 includes graphs 900, 902, and 904 collectively illustrating one example of control signals pc1, pc2, and pc3 generated by the controller 106 when the controller 106 is causing the power conversion stage 102 to act as a buck converter such that the magnitude of the voltage $V_s$ is less than the magnitude of the voltage $V_{in}$. Graph 900 is of the control signal pc1 versus time, graph 902 is of the control signal pc2 versus time, and graph 904 is of the control signal pc3 versus time. The graphs 900, 902, and 904 have a common time base. FIG. 9 assumes that each of the power conversion switching device 116, the power conversion switching device 118, and the power conversion switching device 120 (*i*) operates in its on-state when its respective control signal is logic high and (ii) operates in its off-state when its respective control signal is logic low. FIG. 9 also assumes that the current $I_L$ through the inductor 122 is continuous.

In the FIG. 9 example, the controller 106 generates the control signal pc1 in the FIG. 9 example such that (i) the control signal pc1 has a switching period Tb, (ii) the control signal pc1 is logic high for a duration of $t_{on\_b}$ of each switching period Tb, and (iii) the duration of $t_{on\_b}$ is 60 percent of the switching period Tb. As such, the power conversion switching device 116 has a duty cycle of 60 percent in the FIG. 9 example. The control signal pc2 is complementary to the control signal pc1, and the control signal pc3 is continuously logic low, in the FIG. 9 example. Certain embodiments of the controller 106 are configured to insert deadtime between de-assertion of control signal pc1 and assertion of control signal pc2, and vice versa, to prevent shoot-through, i.e., simultaneous conduction of each of the power conversion switching device 116 and the power conversion switching device 118.

Referring again to FIG. 1, the controller 106 may vary operation of the power conversion stage 102 according to which output power node 112 is being powered by the SIMO DC-to-DC converter 100. For example, assume that (i) the SIMO DC-to-DC converter 100 is powering output power node 112(1) and (ii) a load powered from the output power node 112(1) requires a power supply voltage having a magnitude that is greater than the magnitude of the input voltage $V_{in}$. In this scenario, the controller 106 may cause the power conversion stage 102 to operate as a boost converter such that the magnitude of the voltage $V_s$ is equal to the magnitude of the voltage required by the load powered from the output power node 112(1). Now assume that (i) the SIMO DC-to-DC converter 100 changes its operating state so that the SIMO DC-to-DC converter 100 is powering the output power node 112(2) and (ii) a load powered from the output power node 112(1) requires a power supply voltage having a magnitude that is smaller than the magnitude of the input voltage $V_{in}$. The controller 106 may accordingly cause the power conversion stage 102 to change from operating as a boost converter to operating as a buck converter such that the magnitude of the voltage $V_s$ is equal to the magnitude of the voltage required by the load powered from the output power node 112(2). In some embodiments, the SIMO DC-to-DC converter 100 changes it active output power node 112 at a high rate, and the controller 106 may therefore cause the power conversion stage 102 to change its operating state at a corresponding high rate.

The controller 106 is configured to generate the control signals to control the output switching blocks 104 such that only one output power node 112 is powered by the SIMO DC-to-DC converter 100 at a given time, although some embodiments of the SIMO DC-to-DC converter 100 also support an alternate operating mode where two or more of the output power nodes 112 having a common voltage $V_{out}$ may be simultaneously powered. The controller 106 is also configured to control the output switching blocks 104 so that at least one output switching block 104 provides a path for the current $I_L$ flowing through the inductor 122 when (i) a magnitude of the current $I_L$ is greater than zero and (ii) the power conversion switching device 120 is in its off-state. An output switching block 104 may provide a path for the current $I_L$ by providing a path for the current $I_L$ to flow to a load connected to the respective output power node 112 of the output switching block 104 via the input NMOS FET 202 and output NMOS FET 204 of the output switching block 104. Alternately, an output switching block 104 may provide a path for the current $I_L$ to flow to the reference node 114 via the reference switching device 212 of the output switching block 104. Certain embodiments of the controller 106 are configured so that either the power conversion switching device 120 or at least one instance of an input NMOS FET 202 is in its on-state at any given time to ensure that there is path for the current $I_L$, irrespective of direction of flow of the current.

Additionally, in particular embodiments, the controller 106 is further configured such that an output NMOS FET 204 of a given output switching block 104 may operate in its on-state only if the power conversion switching device 120 is in its off-state and all other output NMOS FETs 204 are in their respective off-states. Furthermore, in some embodiments, the controller 106 is additionally configured such that (i) the power conversion switching device 120 may operate in its on-state only if all output NMOS FETs 204 are in their respective off-states and (ii) the power conversion switching device 120 may switch from its on-state to its off-state only once the PMOS FET 524 and the reference NMOS FET 512 of an output switching block 504 most-recently powering its respective output power node 112 have transitioned from their respective on-states to their respective off-states. Moreover, in certain embodiments, the controller 106 is further configured such to cause each of the PMOS FET 524 and the reference NMOS FET 512 of a given output switching block 504 that is powering its respective output power node 112 to remain in their respective on-states for a time window enclosed within the turn-on time of the power conversion switching device 120 in case the related output switching block 504 has its input NMOS FET 202 turned on and its output NMOS FET 204 turned off, or continuously as long as the related output switching block 504 has its input NMOS FET 202 and its output NMOS FET 204 both turned off.

Figure 10:
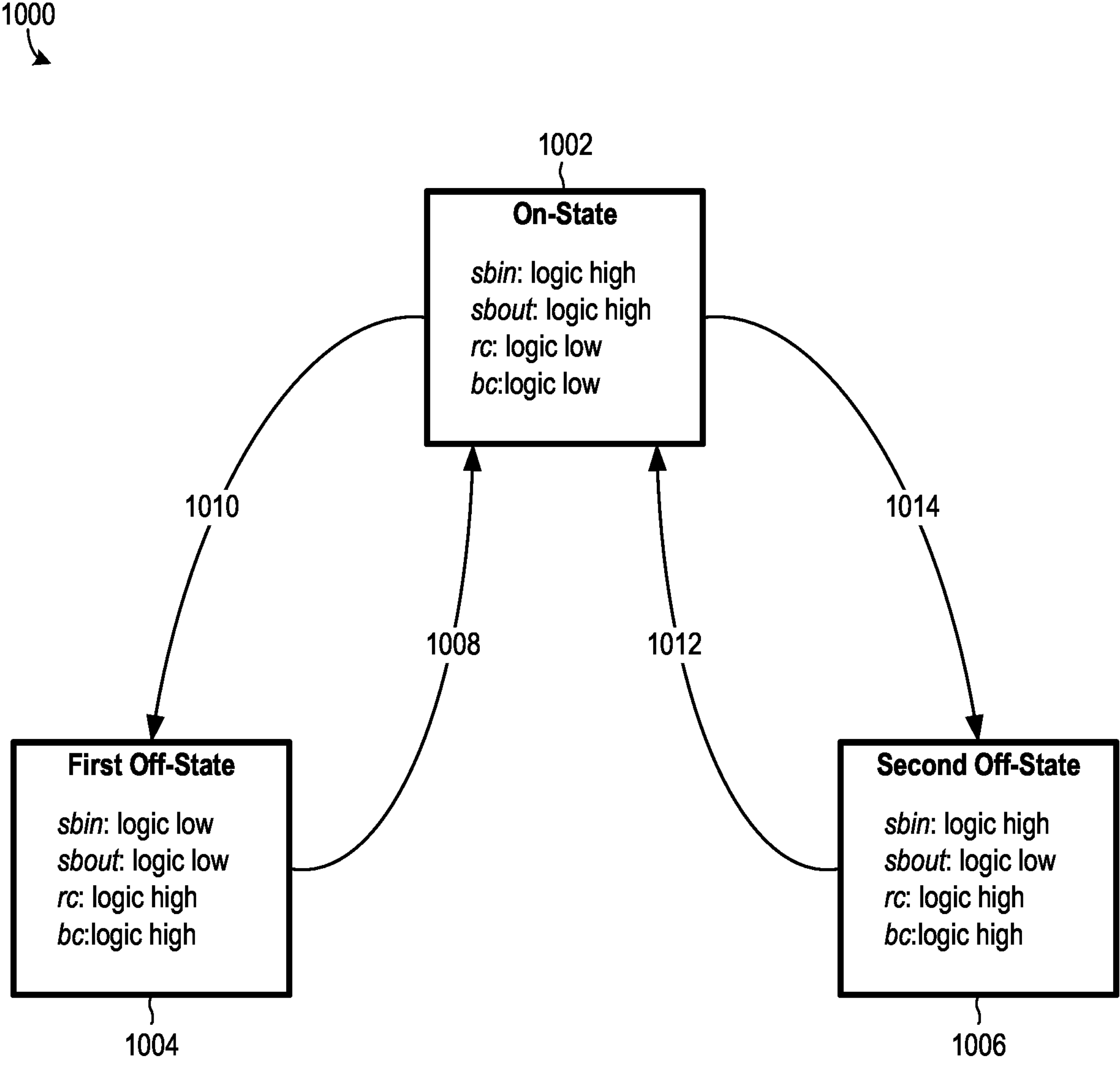
FIG. 10 is a state diagram illustrating example operating states of the FIG. 1 SIMO DC-to-DC converter.

FIG. 10 is a state diagram 1000 illustrating several possible operating states of each output switching block 104, although it is understood that the output switching blocks 104 could operate in other operating states without departing from the scope hereof. FIG. 10 assumes that the output switching blocks 104 are embodied as output switching blocks 504 and that (i) each switching device of the SIMO DC-to-DC converter 100 operates in its on-state with its respective control signal is logic high and (ii) each switching device of the SIMO DC-to-DC converter 100 operates in its off-state with its respective control signal is logic low. State diagram 1000 illustrates three possible operating states of an output switching block 504, i.e., an on-state 1002, a first off-state 1004, and a second off-state 1006. The on-state 1002 of an output switching block 504 is characterized by the output switching block 504 electrically coupling its respective output power node 112 to the switching node 110, such that the respective output power node 112 is powered by the SIMO DC-to-DC converter 100. Accordingly, the control signal sbin and the control signal sbout of the output switching block 504 are logic high in the on-state 1002, to cause each of the input NMOS FET 202 and the output NMOS FET 204 of the output switching block 504 to operate in its on-state. Control signal rc of the output switching block 504 is logic low in the on-state 1002 to cause the reference NMOS FET 512 of the output switching block 504 to operate in its off-state. Additionally, the control signal bc of the output switching block 504 is logic low to cause the PMOS transistor 524 of the output switching block 504 to operate in its off-state, such that the bootstrap power supply rail 220 of the output switching block 504 is isolated from auxiliary power supply rail 126.

The first off-state 1004 of an output switching block 504 is characterized by the output switching block 504 isolating its respective output power node 112 from switching node 110, as well as by the output switching block 504 isolating its respective output power node 112 from the other output power nodes 112. Therefore, the respective output power node 112 of the output switching block 504 is not powered by the SIMO DC-to-DC converter 100 when the output switching block 504 is in the first off-state 1004. Accordingly, the control signal sbin and the control signal sbout of the output switching block 504 are logic low in the first off-state 1004, to cause each of the input NMOS FET 202 and the output NMOS FET 204 of the output switching block 504 to operate in its off-state. The control signal rc of the output switching block 504 is logic high in the first off-state 1004 to cause the reference NMOS FET 512 of the output switching block 504 to operate in its on-state. Additionally, the control signal bc of the output switching block 504 is logic high in the first off-state 1004 to cause the PMOS transistor 524 of the output switching block 504 to operate in its on-state. Consequently, the bootstrap capacitor 522 of the output switching block 504 charges from the auxiliary power supply rail 126 and through the PMOS FET 524 of the output switching block 504, in the first off-state 1004 of the output switching block 504.

The second off-state 1006 of an output switching block 504 is characterized by the SIMO DC-to-DC converter 100 not powering the respective output power node 112 of the output switching block 504. Accordingly, control signal sbout of the output switching block 504 is logic low in the second off-state 1006 to cause the output NMOS FET 204 of the output switching block 504 to operate in its off-state. However, control signal sbin of the output switching block 504 is logic high in the second off-state 1006 to cause the first input NMOS FET 202 of the output switching block 504 to operate in its on-state. Therefore, during dead times, current may flow from switching node 110 to the respective output power node 112 of the output switching block 504 via the body diode 218 of the output NMOS FET 204 of the output switching block 504. Additionally, control signal rc of the output switching block 504 is logic high in the second off-state 1006 to cause the reference NMOS FET 512 to operate in its on-state. Therefore, the output switching block 504 provides a path for current $I_L$ to flow through the reference NMOS FET 512 of the output switching block 504 in the second off-state 1006. Control signal bc of the output switching block 504 is also logic high in the second off-state 1006 to cause the PMOS transistor 524 of the output switching block 504 to operate in its on-state. Consequently, the bootstrap capacitor 522 of the output switching block 504 charges from the auxiliary power supply rail 126 and through the PMOS FET 524 of the output switching block 504 in the second off-state 1006 of the output switching block 504. The controller 106 causes the output switching block 504 to operate in the second off-state 1006 instead of the first off-state 1004, for example, if the output switching block 504 is expected to quickly transition back to the on-state 1002, such as when the output NMOS FET 204 of the output switching block 504 needs to switch between its on-state and its off-state multiple times without the output NMOS FETs 204 of other output switching blocks 504 needing to operate in their respective on-states in the meantime. Operation in the second off-state 1006 instead of in the first off-state 1004 is this scenario advantageously eliminates losses caused by unnecessary switching of the input NMOS FET 202.

Figure 11:
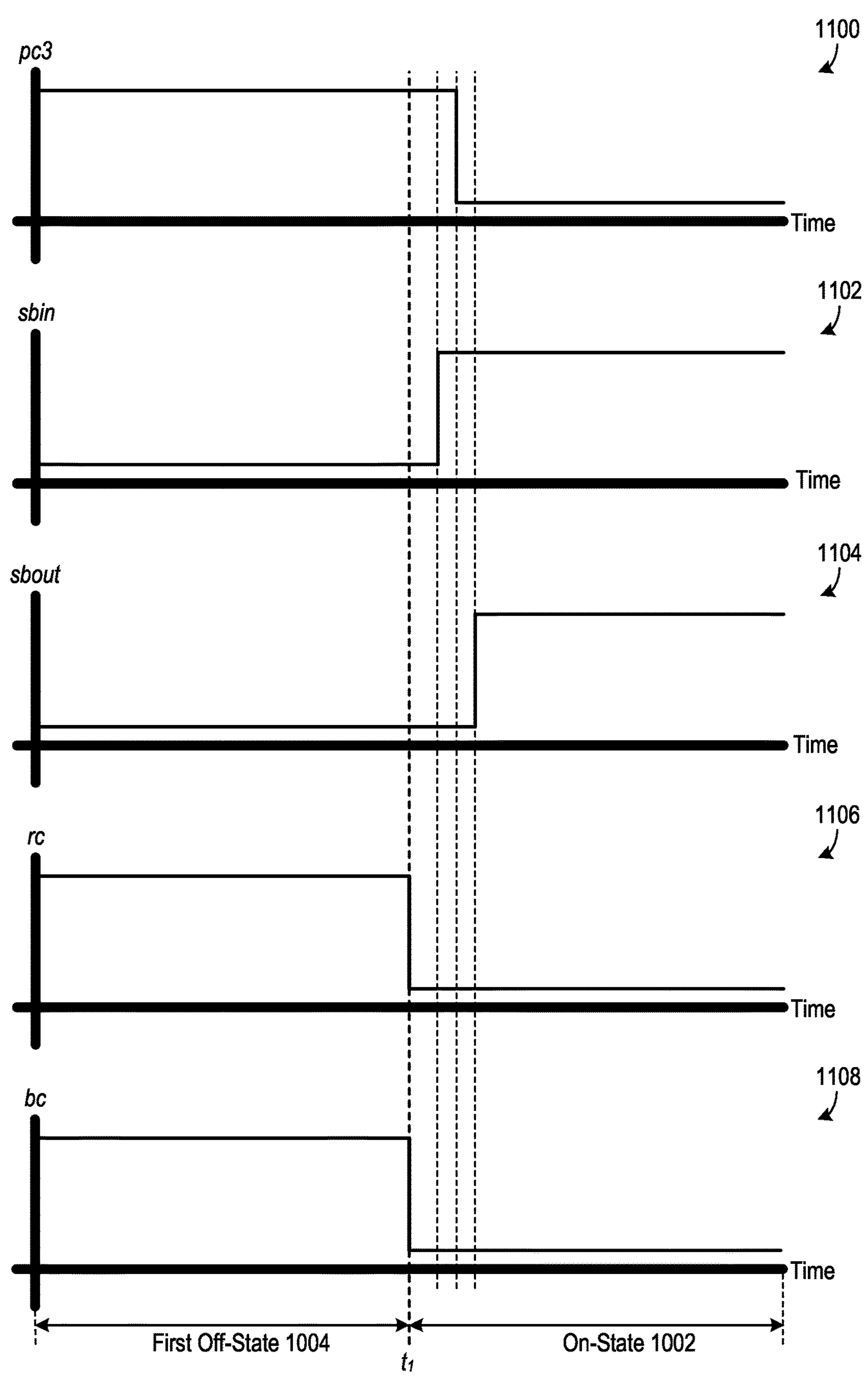
FIG. 11 includes five graphs collectively illustrating an example of an output switching block transitioning from a first off-state to an on-state.

FIG. 11 includes graphs 1100, 1102, 1104, 1106, and 1108 collectively illustrating an example transition 1008 (FIG. 10) of an output switching block 504 from the first off-state 1004 to the on-state 1002. Graph 1100 is of the control signal pc3 versus time, graph 1102 is of the control signal sbin versus time, graph 1104 is of the control signal sbout versus time, graph 1106 is of the control signal rc versus time, and graph 1108 is of the control signal bc versus time. Graphs 1100, 1102, 1104, 1106, and 1108 have a common time base. The output switching block 504 transitions from the first off-state 1004 to the on-state 1002 at a time $t_1$ in the FIG. 11 example. The output switching block 504 accordingly operates in the first off-state 1004 before the time $t_1$, wherein each of the control signal sbin and the control signal sbout is logic low, and each of the control signal rc and the control signal bc is logic high. Additionally, the control signal pc3 is logic high during the first off-state 1004 in the FIG. 11 example. The output switching block 504 transitions from the first off-state 1004 to the on-state 1002 at the time $t_1$, and each of the control signal rc and the control signal bc transitions from logic high to logic low at time $t_1$. The control signal sbin next transitions from logic low to logic high, followed by the control signal pc3 transitioning from logic high to logic low. Finally, the control signal sbout transitions from logic low to logic high after the control signal pc3 has transitioned from logic high to logic low. While power conversion switching device 120 can no longer provide a path for the current $I_L$ after the control signal pc3 transitions to logic low in the on-state 1002, the output switching block 504 provides a path for the current $I_L$ to a load powered from its respective output power node 112 during the on-state 1002.

Figure 12:
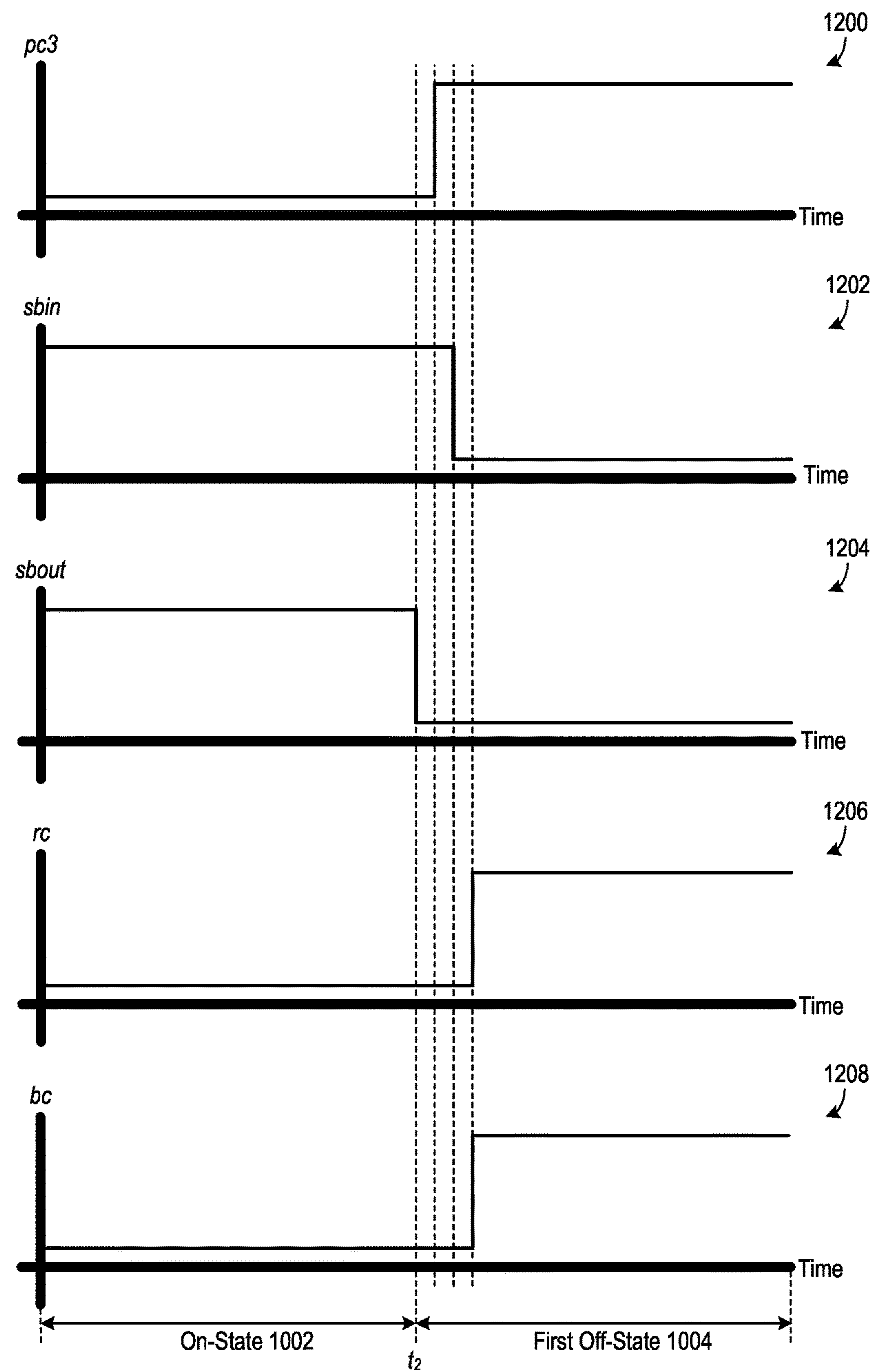
FIG. 12 includes five graphs collectively illustrating an example of an output switching block transitioning from the on-state to the first off-state.

FIG. 12 includes graphs 1200, 1202, 1204, 1206, and 1208 collectively illustrating an example transition 1010 (FIG. 10) of an output switching block 504 from the on-state 1002 to the first off-state 1004. Graph 1200 is of the control signal pc3 versus time, graph 1202 is of the control signal sbin versus time, graph 1204 is of the control signal sbout versus time, graph 1206 is of the control signal rc versus time, and graph 1208 is of the control signal bc versus time. Graphs 1200, 1202, 1204, 1206, and 1208 have a common time base. The output switching block 504 transitions from the on-state 1002 to the first off-state 1004 at a time $t_2$ in the FIG. 12 example. The output switching block 504 accordingly operates in the on-state 1002 before the time $t_2$, wherein each of the control signal sbin and the control signal sbout is logic high, and each of the control signal rc and the control signal bc is logic low. Additionally, the control signal pc3 is logic low during the on-state 1002 in the FIG. 12 example. The output switching block 504 transitions from the on-state 1002 to the first off-state 1004 at the time $t_2$, and the control signal sbout accordingly transitions from logic high to logic low, followed by the control signal pc3 transitioning from logic low to logic high. The control signal sbin transitions from logic high to logic low after control signal pc3 transitions to logic high. Finally, the control signal rc and the control signal bc transition from logic low to logic high together after the control signal sbin has transitioned from logic high to logic low. Once the power conversion switching device 120 is in its on-state, the output switching block 504 no longer needs to provide a path for the current $I_L$.

Figure 13:
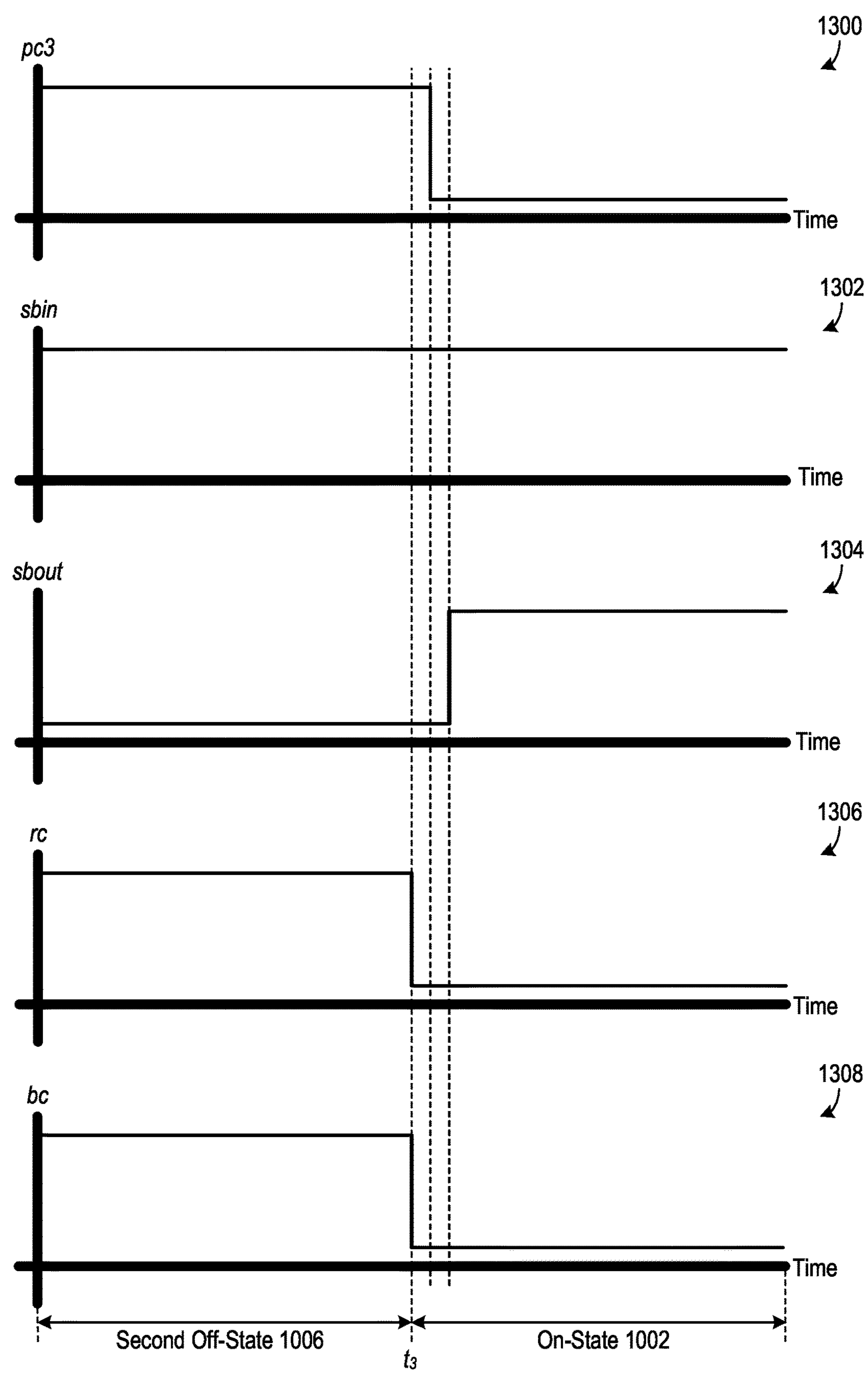
FIG. 13 includes five graphs collectively illustrating an example of an output switching block transitioning from a second off-state to the on-state.

FIG. 13 includes graphs 1300, 1302, 1304, 1306, and 1308 collectively illustrating an example transition 1012 (FIG. 10) of an output switching block 504 from the second off-state 1006 to the on-state 1002. Graph 1300 is of the control signal pc3 versus time, graph 1302 is of the control signal sbin versus time, graph 1304 is of the control signal sbout versus time, graph 1306 is of the control signal rc versus time, and graph 1308 is of the control signal bc versus time. Graphs 1300, 1302, 1304, 1306, and 1308 have a common time base. The output switching block 504 transitions from the second off-state 1006 to the on-state 1002 at a time $t_3$ in the FIG. 13 example. The output switching block 504 accordingly operates in the second off-state 1006 before the time $t_3$, wherein the control signal sbin is logic high, the control signal sbout is logic low, and each of the control signal rc and the control signal bc is logic high. Additionally, the control signal pc3 is logic high during the second off-state 1006 in the FIG. 13 example. The output switching block 504 transitions from the second off-state 1006 to the on-state 1002 at the time $t_3$, and the control signal rc and the control signal bc transition from logic high to logic low together. Next, the control signal pc3 transitions from logic high to logic low after each of the control signal rc and the control signal bc have transitioned from logic high to logic low, and the control signal sbout transitions from logic low to logic high after the control signal pc3 has transitioned to logic low. The output switching block 504 provides a path for the current $I_L$ to a load powered from its respective output power node 112 once the control signal sbout is logic high.

Figure 14:
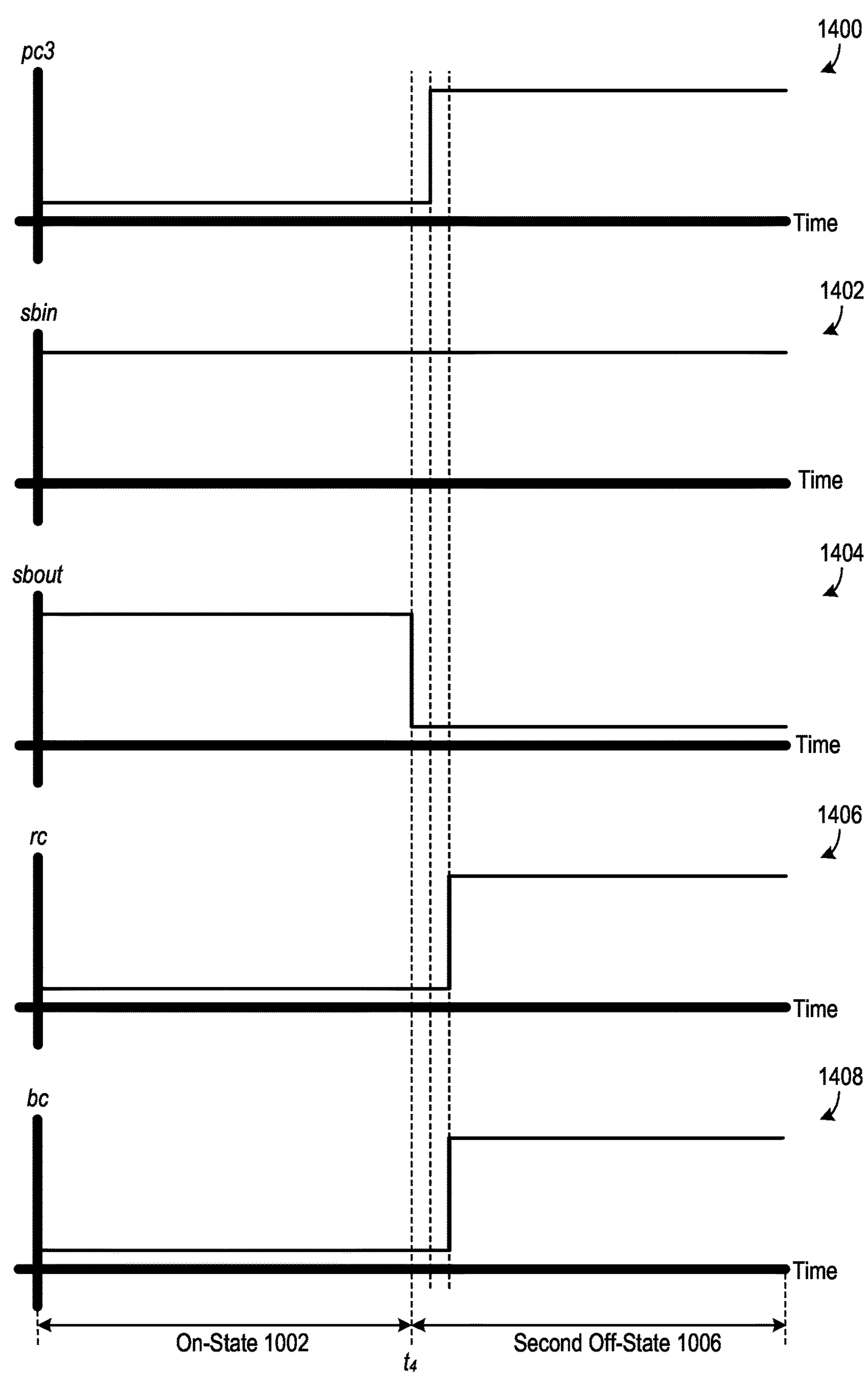
FIG. 14 includes five graphs collectively illustrating an example of an output switching block transitioning from the on-state to the second off-state.

FIG. 14 includes graphs 1400, 1402, 1404, 1406, and 1408 collectively illustrating an example transition 1014 (FIG. 10) of an output switching block 504 from the on-state 1002 to the second off-state 1006. Graph 1400 is of the control signal pc3 versus time, graph 1402 is of the control signal sbin versus time, graph 1404 is of the control signal sbout versus time, graph 1406 is of the control signal rc versus time, and graph 1408 is of the control signal bc versus time. Graphs 1400, 1402, 1404, 1406, and 1408 have a common time base. The output switching block 504 transitions from the on-state 1002 to the second off-state 1006 at a time $t_4$ in the FIG. 14 example. The output switching block 504 accordingly operates in the on-state 1002 before the time $t_4$, wherein each of the control signal sbin and the control signal sbout is logic high, and each of the control signal rc and the control signal bc is logic low. Additionally, the control signal pc3 is logic low during the on-state 1002 in the FIG. 14 example. The output switching block 504 transitions from the on-state 1002 to the second off-state 1006 at the time $t_4$, and the control signal sbout accordingly transitions from logic high to logic low. The control signal pc3 transitions from logic low to logic high after the control signal sbout is logic low. Finally, the control signal rc and the control signal bc transition from logic low to logic high together after the control signal pc3 is logic high. Consequently, there is a path for the current $I_L$ through both of the power conversion switching device 120 and the reference NMOS FET 512 of the output switching block 504 in the second off-state 1006 after switching transitions are complete slightly after time $t_4$.

Figure 15:
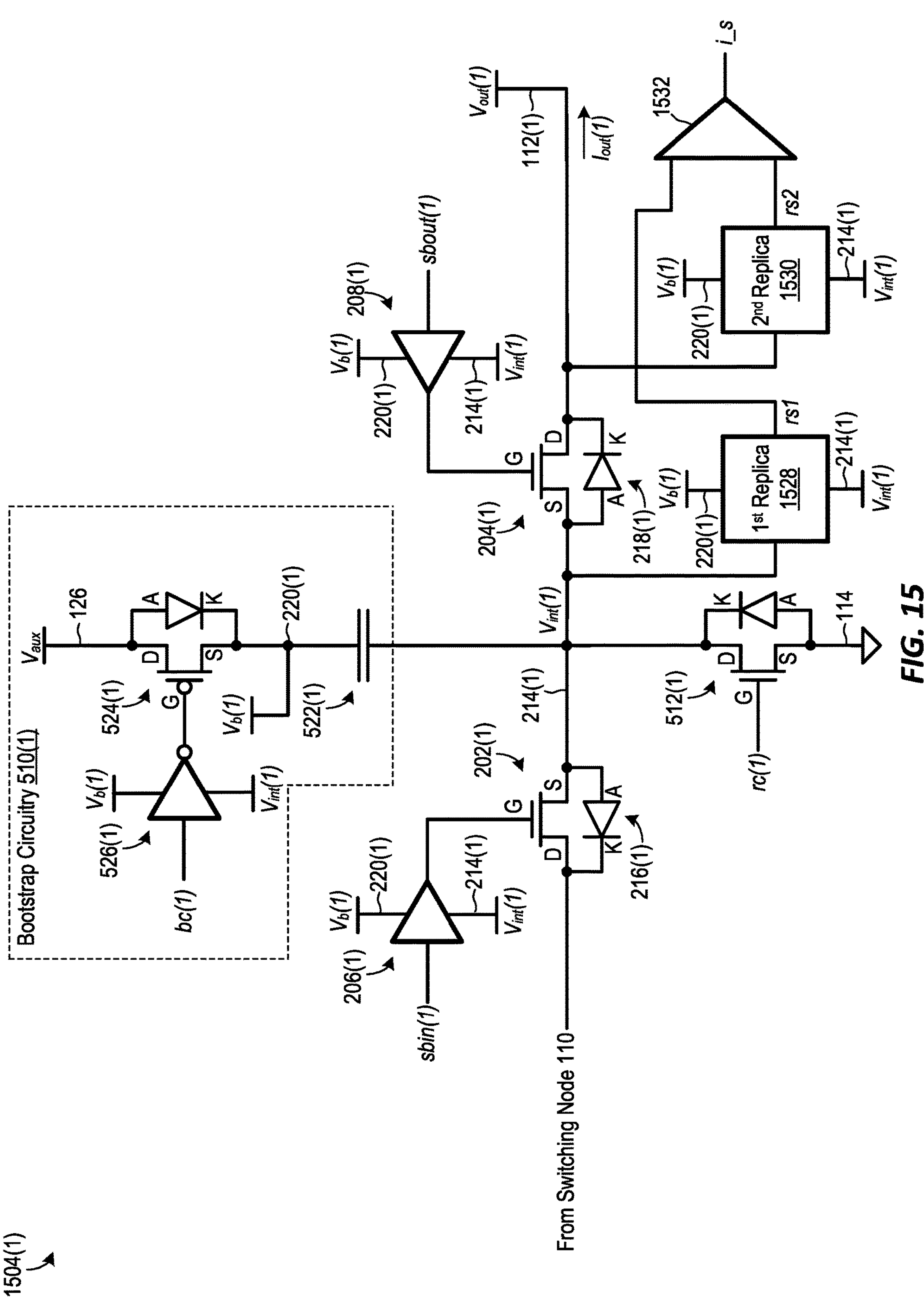
FIG. 15 is a schematic diagram of an alternate embodiment of the FIG. 5 output switching block that further includes elements to perform current sensing.

Referring again to FIG. 5-7, any of the output switching blocks 504 could be modified to include one or more additional elements. For example, FIG. 15 is a schematic diagram of an output switching block 1504(1), which is an alternate embodiment of the output switching block 504(1) (FIG. 5) further including elements to perform current sensing. It is understood that the other output switching blocks 504 could be modified in a manner similar to that illustrated in FIG. 15. The output switching block 1504(1) differs from the output switching block 504(1) in that output switching block 1504(1) further includes first replica circuitry 1528, second replica circuitry 1530, and a current sense comparator 1532. Each of the first replica circuitry 1528 and the second replica circuitry 1530 is a scaled model of the output NMOS FET 204(1). Additionally, each of the first replica circuitry 1528 and the second replica circuitry 1530 operates in the same power supply domain as the switching device driver circuitry of the output switching block 1504(1), i.e., between the bootstrap power supply rail 220(1) and the internal node 214(1). The first replica circuitry 1528 generates a signal rs1 in response to voltage at the internal node 214(1), and the second replica circuitry 1530 generates a signal rs2 in response to voltage at the output power node 112(1). The current sense comparator 1532 compares the signal rs1 and the signal rs2 to generate a signal i_s representing magnitude of current flowing through the output NMOS FET 204(1).

Combinations of Features

Features described above may be combined in various ways without departing from the scope hereof. The following examples illustrate some possible combinations.

(A1) A single-input, multiple-output (SIMO) direct-current-to-direct-current (DC-to-DC) converter includes a power conversion stage and a plurality of output switching blocks. The power conversion stage is electrically coupled between an input power node and a switching node, and the power conversion stage includes a first power conversion switching device electrically coupled between the switching node and a reference node. Each output switching block is electrically coupled between the switching node and a respective output power node. Each output switching block includes (1) a respective input enhancement mode, N-type metal oxide semiconductor field effect transistor (input NMOS FET) of the output switching block that is electrically coupled between the switching node and a respective internal node of the output switching block, where the input NMOS FET includes a respective body diode oriented such that (i) a cathode of the body diode is electrically coupled to the switching node and (ii) an anode of the body diode is electrically coupled to the respective internal node of the output switching block, and (2) a respective output enhancement mode, N-type metal oxide semiconductor field effect transistor (output NMOS FET) of the output switching block that is electrically coupled between the respective internal node of the output switching block and the respective output power node of the output switching block, where the output NMOS FET includes a respective body diode oriented such that (i) a cathode of the body diode is electrically coupled to the respective output power node of the output switching block and (ii) an anode of the body diode is electrically coupled to the respective internal node of the output switching block.

(A2) In the SIMO DC-to-DC converter denoted as (A1), each output switching block may further include (1) respective bootstrap circuitry of the output switching block that is configured to generate a respective bootstrap power supply rail of the output switching block referenced to the respective internal node of the output switching block, (2) respective input switch driver circuitry of the output switching block that is configured to drive a gate of the respective input NMOS FET of the output switching block and is electrically powered by the respective bootstrap power supply rail of the output switching block, and (3) respective output switch driver circuitry of the output switching block that is configured to drive a gate of the respective output NMOS FET of the output switching block and is electrically powered by the respective bootstrap power supply rail of the output switching block.

(A3) The SIMO DC-to-DC converter denoted as (A1) may further include a controller configured to control at least each of the first power conversion switching device, the respective input NMOS FET of each output switching block, and the respective output NMOS FET of each output switching block.

(A4) In the SIMO DC-to-DC converter denoted as (A3), the controller may be further configured to control each of the first power conversion switching device, the respective input NMOS FET of each output switching block, and the respective output NMOS FET of each output switching block in a manner which provides a path for current flowing through an inductor of the power conversion stage at any time during operation of the SIMO DC-to-DC converter.

(A5) In either one of the SIMO DC-to-DC converters denoted as (A3) or (A4), the controller may be further configured to control the first power conversion switching device such that the first power conversion switching device operates in its on-state solely when the respective output NMOS FET of each output switching block operates in its respective off-state.

(A6) In any one of the SIMO DC-to-DC converters denoted as (A1) through (A5), (i) each output switching block may further include a respective reference switching device electrically coupled between the respective internal node of the output switching block and the reference node, (ii) each output switching block may further include a respective bootstrap capacitor and a respective bootstrap control switching device electrically coupled in series between the respective internal node of the output switching block and an auxiliary power supply rail.

(A7) In the SIMO DC-to-DC converter denoted as (A6), the controller may be further configured, with respect to each output switching block, to control the first power conversion switching device to cause the first power conversion switching device to switch from its on-state to its off-state after each of (i) the respective reference switching device of the output switching block has switched from its on-state to its off-state and (ii) the respective bootstrap control switching device of the output switching block has switched from its on-state to its off-state.

(A8) In either one of the SIMO DC-to-DC converters denoted as (A6) or (A7), the controller may be further configured to control the respective reference switching device of each output switching block and the respective bootstrap control switching device of each output switching block such that in a given output switching block, the respective reference switching device of the output switching block and the respective bootstrap control switching device of the output switching block do not switch from the their respective off-states to their respective on-state until after (i) the respective output NMOS FET of the output switching block has switched from its on-state to its off-state and (ii) the first power conversion switching device has switched from its off-state to its on-state.

(A9) In any one of the SIMO DC-to-DC converters denoted as (A3) through (A8), wherein the controller may be further configured to control the respective output NMOS FET of each output switching block in a manner such that at most one output NMOS FET is in its on-state at any given time during operation of the SIMO DC-to-DC converter.

(A10) In any one of the SIMO DC-to-DC converters denoted as (A3) through (A9), the controller may be further configured to control the respective output NMOS FET of each output switching block such that each output NMOS FET does not switch from its off-state to its on-state until after the first power conversion device switches from its on-state to its off-state.

(A11) In any one of the SIMO DC-to-DC converters denoted as (A3) through (A10), the controller may be further configured to control the respective input NMOS FET of each output switching block such that in a given output switching block, the respective input NMOS FET of the output switching block switches from its off-state to its on-state before the first power conversion switching device switches from its on-state to its off-state.

(A12) In any one of the SIMO DC-to-DC converters denoted as (A3) through (A11), the controller may be further configured to control the respective input NMOS FET of each output switching block such that in a given output switching block, the respective input NMOS FET of the output switching block switches from its on-state to its off-state after the first power conversion switching device switches from its off-state to its on-state.

(A13) In the SIMO DC-to-DC converter denoted as (A2), the respective bootstrap circuitry of each output switching block may include (i) a respective bootstrap capacitor electrically coupled between the respective bootstrap power supply rail of the output switching block and the respective internal node of the output switching block and (ii) a respective bootstrap control switching device electrically coupled between an auxiliary power supply rail and the respective bootstrap capacitor of the output switching block.

(A14) In any one of the SIMO DC-to-DC converters denoted as (A1) through (A13), the power conversion stage may have a buck and boost topology.

(B1) A single-input, multiple-output (SIMO) direct-current-to-direct-current (DC-to-DC) converter includes a power conversion stage, a first output switching block, and a second output switching block. The power conversion stage electrically is coupled between an input power node and a switching node, and the power conversion stage includes a first power conversion switching device electrically coupled between the switching node and a reference node. The first output switching block includes (1) a first input enhancement mode, N-type metal oxide semiconductor field effect transistor (first input NMOS FET) electrically coupled between the switching node and a first internal node, where the first input NMOS FET includes a body diode oriented such that (i) a cathode of the body diode is electrically coupled to the switching node and (ii) an anode of the body diode is electrically coupled to the first internal node, and (2) a first output enhancement mode, N-type metal oxide semiconductor field effect transistor (first output NMOS FET) electrically coupled between the first internal node and a first output power node, where the first output NMOS FET includes a body diode oriented such that (i) a cathode of the body diode is electrically coupled to the first output power node and (ii) an anode of the body diode is electrically coupled to the first internal node. The second output switching block includes (1) a second input enhancement mode, N-type metal oxide semiconductor field effect transistor (second input NMOS FET) electrically coupled between the switching node and a second internal node, where the second input NMOS FET includes a body diode oriented such that (i) a cathode of the body diode is electrically coupled to the switching node and (ii) an anode of the body diode is electrically coupled to the second internal node, and (2) a second output enhancement mode, N-type metal oxide semiconductor field effect transistor (second output NMOS FET) electrically coupled between the second internal node and a second output power node, where the second output NMOS FET includes a body diode oriented such that (i) a cathode of the body diode is electrically coupled to the second output power node and (ii) an anode of the body diode is electrically coupled to the second internal node.

(B2) In the SIMO DC-to-DC converter denoted as (B1), (1) the first output switching block may further include (i) first bootstrap circuitry configured to generate a first bootstrap power supply rail referenced to the first internal node, (ii) first input switch driver circuitry configured to drive a gate of the first input NMOS FET and being electrically powered by the first bootstrap power supply rail, and (iii) first output switch driver circuitry configured to drive a gate of the first output NMOS FET and being electrically powered by the first bootstrap power supply rail, and (2) the second output switching block may further include (i) second bootstrap circuitry configured to generate a second bootstrap power supply rail referenced to the second internal node, (ii) second input switch driver circuitry configured to drive a gate of the second input NMOS FET and being electrically powered by the second bootstrap power supply rail, and (iii) second output switch driver circuitry configured to drive a gate of the second output NMOS FET and being electrically powered by the second bootstrap power supply rail.

(B3) Either one of the SIMO DC-to-DC converters denoted as (B1) and (B2) may further include a controller configured to control at least each of the first power conversion switching device, the first input NMOS FET, the first output NMOS FET, the second input NMOS FET, and the second output NMOS FET.

(B4) In the SIMO DC-to-DC converter denoted as (B3), the controller may be further configured to control at least each of the first power conversion switching device, the first input NMOS FET, the first output NMOS FET, the second input NMOS FET, and the second output NMOS FET in a manner which provides a path for current flowing through an inductor of the power conversion stage at any time during operation of the SIMO DC-to-DC converter.

(B5) Any one of the SIMO DC-to-DC converters denoted as (B1) through (B4) may further include a third output switching block including (1) a third input enhancement mode, N-type metal oxide semiconductor field effect transistor (third input NMOS FET) electrically coupled between the switching node and a third internal node, where the third input NMOS FET includes a body diode oriented such that (i) a cathode of the body diode is electrically coupled to the switching node and (ii) an anode of the body diode is electrically coupled to the third internal node, and (2) a third output enhancement mode, N-type metal oxide semiconductor field effect transistor (third output NMOS FET) electrically coupled between the third internal node and a third output power node, where the third output NMOS FET includes a body diode oriented such that (i) a cathode of the body diode is electrically coupled to the third output power node and (ii) an anode of the body diode is electrically coupled to the third internal node.

(C1) A method for controlling a plurality of output switching blocks in a single-input, multiple-output (SIMO) direct-current-to-direct-current (DC-to-DC) converter includes, in each of the plurality of output switching blocks, (1) generating a respective bootstrap power supply rail of the output switching block referenced to a respective internal node of the output switching block, (2) driving a gate of a respective input enhancement mode, N-type metal oxide semiconductor field effect transistor (input NMOS FET) of the output switching block between a voltage of the respective bootstrap power supply rail of the output switching block and a voltage of the respective internal node of the output switching block, where a drain of the respective input NMOS FET of the output switching block is electrically coupled to a switching node of the SIMO DC-to-DC converter, and a source of the respective input NMOS FET of the output switching block is electrically coupled to the respective internal node of the output switching block, and (3) driving a gate of a respective output enhancement mode, N-type metal oxide semiconductor field effect transistor (output NMOS FET) of the output switching block between a voltage of the respective bootstrap power supply rail of the output switching block and a voltage of the respective internal node of the output switching block, where a drain of the respective output NMOS FET of the output switching block is electrically coupled to a respective output power node of the output switching block, and a source of the respective output NMOS FET of the output switching block is electrically coupled to the respective internal node of the output switching block.

(C2) The method denoted as (C1) may further include controlling the respective input NMOS FET of each output switching block and the respective output NMOS FET of each output switching block such that the respective output power node of at most one output switching block at any given time is powered by the SIMO DC-to-DC converter during operation of the SIMO DC-to-DC converter.

Changes may be made in the above methods, devices, and systems without departing from the scope hereof. For example, power conversion stage 102 could be modified to have a different topology, such a buck topology or a boost topology instead of a buck and boost topology. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A single-input, multiple-output (SIMO) direct-current-to-direct-current (DC-to-DC) converter, comprising:

a power conversion stage electrically coupled between an input power node and a switching node, the power conversion stage including a first power conversion switching device electrically coupled between the switching node and a reference node; and a plurality of output switching blocks, each output switching block being electrically coupled between the switching node and a respective output power node, each output switching block including:

a respective input enhancement mode, N-type metal oxide semiconductor field effect transistor (input NMOS FET) of the output switching block that is electrically coupled between the switching node and a respective internal node of the output switching block;

a respective output NMOS FET of the output switching block that is electrically coupled between the respective internal node of the output switching block and the respective output power node of the output switching block;

respective bootstrap circuitry of the output switching block that is configured to generate a respective bootstrap power supply rail of the output switching block referenced to the respective internal node;

respective input switch driver circuitry of the output switching block that is configured to drive a gate of the respective input NMOS FET and is electrically powered by the respective bootstrap power supply rail; and respective output switch driver circuitry of the output switching block that is configured to drive a gate of the respective output NMOS FET and is electrically powered by the respective bootstrap power supply rail.

2. The SIMO DC-to-DC converter of claim 1, further comprising a controller configured to control at least each of the first power conversion switching device, the respective input NMOS FET of each output switching block, and the respective output NMOS FET of each output switching block.

3. The SIMO DC-to-DC converter of claim 2, wherein the controller is further configured to control each of the first power conversion switching device, the respective input NMOS FET of each output switching block, and the respective output NMOS FET of each output switching block in a manner which provides a path for current flowing through an inductor of the power conversion stage at any time during operation of the SIMO DC-to-DC converter.

4. The SIMO DC-to-DC converter of claim 2, wherein the controller is further configured to control the first power conversion switching device such that the first power conversion switching device operates in its on-state solely when the respective output NMOS FET of each output switching block operates in its respective off-state.

5. The SIMO DC-to-DC converter of claim 2, wherein:

each output switching block further includes a respective reference switching device electrically coupled between the respective internal node of the output switching block and the reference node;

each output switching block further includes a respective bootstrap capacitor and a respective bootstrap control switching device electrically coupled in series between the respective internal node of the output switching block and an auxiliary power supply rail; and with respect to each output switching block, the controller is further configured to control the first power conversion switching device to cause the first power conversion switching device to switch from its on-state to its off-state after each of (i) the respective reference switching device of the output switching block has switched from its on-state to its off-state and (ii) the respective bootstrap control switching device of the output switching block has switched from its on-state to its off-state.

6. The SIMO DC-to-DC converter of claim 2, wherein the controller is further configured to control the respective output NMOS FET of each output switching block in a manner such that at most one output NMOS FET is in its on-state at any given time during operation of the SIMO DC-to-DC converter.

7. The SIMO DC-to-DC converter of claim 2, wherein the controller is further configured to control the respective output NMOS FET of each output switching block such that each output NMOS FET does not switch from its off-state to its on-state until after the first power conversion device switches from its on-state to its off-state.

8. The SIMO DC-to-DC converter of claim 2, wherein:

each output switching block further includes a respective reference switching device electrically coupled between the respective internal node of the output switching block and the reference node;

each output switching block further includes a respective bootstrap capacitor and a respective bootstrap control switching device electrically coupled in series between the respective internal node of the output switching block and an auxiliary power supply rail; and the controller is further configured to control the respective reference switching device of each output switching block and the respective bootstrap control switching device of each output switching block such that in a given output switching block, the respective reference switching device of the output switching block and the respective bootstrap control switching device of the output switching block do not switch from the their respective off-states to their respective on-state until after (i) the respective output NMOS FET of the output switching block has switched from its on-state to its off-state and (ii) the first power conversion switching device has switched from its off-state to its on-state.

9. The SIMO DC-to-DC converter of claim 2, wherein the controller is further configured to control the respective input NMOS FET of each output switching block such that in a given output switching block, the respective input NMOS FET of the output switching block switches from its off-state to its on-state before the first power conversion switching device switches from its on-state to its off-state.

10. The SIMO DC-to-DC converter of claim 2, wherein the controller is further configured to control the respective input NMOS FET of each output switching block such that in a given output switching block, the respective input NMOS FET of the output switching block switches from its on-state to its off-state after the first power conversion switching device switches from its off-state to its on-state.

11. The SIMO DC-to-DC converter of claim 1, wherein the respective bootstrap circuitry of each output switching block includes:

a respective bootstrap capacitor electrically coupled between the respective bootstrap power supply rail of the output switching block and the respective internal node of the output switching block; and a respective bootstrap control switching device electrically coupled between an auxiliary power supply rail and the respective bootstrap capacitor of the output switching block.

12. The SIMO DC-to-DC converter of claim 1, wherein the power conversion stage has a buck and boost topology.

13. The SIMO DC-to-DC converter of claim 1, wherein the respective input NMOS FET includes a first body diode oriented such that (i) a cathode of the first body diode is electrically coupled to the switching node and (ii) an anode of the first body diode is electrically coupled to the respective internal node.

14. The SIMO DC-to-DC converter of claim 13, wherein the respective output NMOS FET includes a second body diode oriented such that (i) a cathode of the second body diode is electrically coupled to the respective output power node and (ii) an anode of the second body diode is electrically coupled to the respective internal node.

15. A single-input, multiple-output (SIMO) direct-current-to-direct-current (DC-to-DC) converter, comprising:

a power conversion stage electrically coupled between an input power node and a switching node, the power conversion stage including a first power conversion switching device electrically coupled between the switching node and a reference node;

a first output switching block including a first input enhancement mode, N-type metal oxide semiconductor field effect transistor (first input NMOS FET) electrically coupled between the switching node and a first internal node, NMOS FET electrically coupled between the first internal node and a first output power node, first bootstrap circuitry configured to generate a first bootstrap power supply rail referenced to the first internal node, first input switch driver circuitry configured to drive a gate of the first input NMOS FET and being electrically powered by the first bootstrap power supply rail, and first output switch driver circuitry configured to drive a gate of the first output NMOS FET and being electrically powered by the first bootstrap power supply rail; and a second output switching block including a second input NMOS FET electrically coupled between the switching node and a second internal node, a second output NMOS FET electrically coupled between the second internal node and a second output power node, second bootstrap circuitry configured to generate a second bootstrap power supply rail referenced to the second internal node, second input switch driver circuitry configured to drive a gate of the second input NMOS FET and being electrically powered by the second bootstrap power supply rail, and second output switch driver circuitry configured to drive a gate of the second output NMOS FET and being electrically powered by the second bootstrap power supply rail.

16. The SIMO DC-to-DC converter of claim 15, further comprising a controller configured to control at least each of the first power conversion switching device, the first input NMOS FET, the first output NMOS FET, the second input NMOS FET, and the second output NMOS FET.

17. The SIMO DC-to-DC converter of claim 16, wherein the controller is further configured to control at least each of the first power conversion switching device, the first input NMOS FET, the first output NMOS FET, the second input NMOS FET, and the second output NMOS FET in a manner which provides a path for current flowing through an inductor of the power conversion stage at any time during operation of the SIMO DC-to-DC converter.

18. The SIMO DC-to-DC converter of claim 15, further comprising a third output switching block including:

a third input enhancement mode, N-type metal oxide semiconductor field effect transistor (third input NMOS FET) electrically coupled between the switching node and a third internal node, the third input NMOS FET including a body diode oriented such that (i) a cathode of the body diode is electrically coupled to the switching node and (ii) an anode of the body diode is electrically coupled to the third internal node; and a third output enhancement mode, N-type metal oxide semiconductor field effect transistor (third output NMOS FET) electrically coupled between the third internal node and a third output power node, the third output NMOS FET including a body diode oriented such that (i) a cathode of the body diode is electrically coupled to the third output power node and (ii) an anode of the body diode is electrically coupled to the third internal node.

19. A method for controlling a plurality of output switching blocks in a single-input, multiple-output (SIMO) direct-current-to-direct-current (DC-to-DC) converter, the method comprising, in each of the plurality of output switching blocks:

generating a respective bootstrap power supply rail of the output switching block referenced to a respective internal node of the output switching block;

driving a gate of a respective input enhancement mode, N-type metal oxide semiconductor field effect transistor (input NMOS FET) of the output switching block between a voltage of the respective bootstrap power supply rail of the output switching block and a voltage of the respective internal node of the output switching block, a drain of the respective input NMOS FET of the output switching block being electrically coupled to a switching node of the SIMO DC-to-DC converter, and a source of the respective input NMOS FET of the output switching block being electrically coupled to the respective internal node of the output switching block; and driving a gate of a respective output enhancement mode, N-type metal oxide semiconductor field effect transistor (output NMOS FET) of the output switching block between a voltage of the respective bootstrap power supply rail of the output switching block and a voltage of the respective internal node of the output switching block, a drain of the respective output NMOS FET of the output switching block being electrically coupled to a respective output power node of the output switching block, and a source of the respective output NMOS FET of the output switching block being electrically coupled to the respective internal node of the output switching block.

20. The method of claim 19, further comprising controlling the respective input NMOS FET of each output switching block and the respective output NMOS FET of each output switching block such that the respective output power node of at most one output switching block at any given time is powered by the SIMO DC-to-DC converter during operation of the SIMO DC-to-DC converter.

* * * * *